US012771211B2

(12) United States Patent
Takushima et al.

(10) Patent No.: US 12,771,211 B2
(45) Date of Patent: Oct. 20, 2026

(54) ABSOLUTE ENCODER AND ELECTRIC MOTOR

(71) Applicant: Mitsubishi Electric Corporation, Tokyo (JP)

(72) Inventors: Shigeru Takushima, Tokyo (JP); Takeshi Musha, Tokyo (JP); Akihiko Higuchi, Tokyo (JP); Toshio Mekata, Tokyo (JP); Takuya Noguchi, Tokyo (JP); Hitoshi Hasegawa, Tokyo (JP); Yuji Kubo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 205 days.

(21) Appl. No.: 18/723,885

(22) PCT Filed: Mar. 23, 2022

(86) PCT No.: PCT/JP2022/013706

§ 371 (c)(1),
(2) Date: Jun. 25, 2024

(87) PCT Pub. No.: WO2023/181213

PCT Pub. Date: Sep. 28, 2023

(65) Prior Publication Data

US 2025/0055353 A1 Feb. 13, 2025

(51) Int. Cl.
*H02K 11/22* (2016.01)
*G01D 5/347* (2006.01)

(52) U.S. Cl.
CPC ......... *H02K 11/22* (2016.01); *G01D 5/34707* (2013.01); *G01D 5/34776* (2013.01)

(58) Field of Classification Search
CPC ............. G01D 5/2455; G01D 5/34707; G01D 5/34776; H02K 11/22
See application file for complete search history.

(56) References Cited

U.S. PATENT DOCUMENTS 5,129,725 A 7/1992 Ishizuka et al.
5,699,058 A * 12/1997 Yanagisawa .......... H03M 1/143 341/1

(Continued)

FOREIGN PATENT DOCUMENTS

JP S63-117214 A 5/1988
JP H03-287014 A 12/1991

(Continued)

OTHER PUBLICATIONS

U.S. Appl. No. 18/723,885, filed Mar. 9, 2026_JP_2007071732_A_H.pdf (Year: 2026).*

(Continued)

*Primary Examiner* — Christopher M Koehler
*Assistant Examiner* — Ahmed F Seck
(74) *Attorney, Agent, or Firm* — XSENSUS LLP

(57) ABSTRACT

An absolute encoder includes: a scale including an optical pattern that includes code patterns for a plurality of cycles; an illumination unit that outputs light for illuminating the scale; a light detection unit that detects light from the scale; a section determination unit that determines, for a region of the optical pattern divided into a plurality of sections, the section to which a code string belongs; and an absolute position calculation unit that obtains an absolute position of the scale on the basis of the section determined and the code string. When N is the number of the cycles of the code patterns on the scale, in a case where N is equal to two, the number of the sections is three or more, and in a case where N is equal to three or more, the number of the sections is N or more.

20 Claims, 14 Drawing Sheets

(56) References Cited

U.S. PATENT DOCUMENTS

| | | | | |
|---|---|---|---|---|
| 2015/0069225 | A1 | 3/2015 | Kim et al. | |
| 2015/0070001 | A1* | 3/2015 | Villaret .................. | G01D 5/145<br>324/207.2 |

FOREIGN PATENT DOCUMENTS

| | | | | |
|---|---|---|---|---|
| JP | H04-001522 | A | | 1/1992 |
| JP | H04-160317 | A | | 6/1992 |
| JP | 2000-352523 | A | | 12/2000 |
| JP | 2004-093502 | A | | 3/2004 |
| JP | 2005-091270 | A | | 4/2005 |
| JP | 2007071732 | A | * | 3/2007 |
| JP | 2010217160 | A | * | 9/2010 |

OTHER PUBLICATIONS

U.S. Appl. No. 18/723,885, filed Mar. 9, 2026_JP_2010217160_A_H.pdf (Year: 2026).*

International Search Report and Written Opinion mailed on May 10, 2022, received for PCT Application PCT/JP2022/013706, filed on Mar. 23, 2022, 10 pages including English Translation.

Decision to Grant mailed on Sep. 20, 2022, received for JP Application 2022-548185, 7 pages including English Translation.

* cited by examiner

ABSOLUTE ENCODER AND ELECTRIC MOTOR

CROSS-REFERENCE TO RELATED APPLICATION

This application is a national stage application, pursuant to 35 U.S.C. § 371, of International Patent Application No. PCT/JP2022/013706, filed Mar. 23, 2022, the entire contents of which are incorporated herein by reference.

FIELD

The present disclosure relates to an absolute encoder and an electric motor, the absolute encoder detecting an absolute position of a measurement target.

BACKGROUND

In the field of machine tools, robots, and the like, an absolute encoder is used to achieve positioning control with high accuracy. The absolute encoder detects reflected light or transmitted light from an optical pattern on a scale by a light detection unit, and obtains an absolute position of the scale by arithmetic processing of a signal corresponding to intensity of the light. As the optical pattern, a random pattern such as an M-sequence pattern is used. The absolute encoder includes a rotary absolute encoder that detects an angle of rotation of a shaft of a motor or the like, and a linear absolute encoder that detects a position of a linear stage. Hereinafter, the rotary absolute encoder is referred to as a rotary encoder, and the linear absolute encoder is referred to as a linear encoder.

In the rotary encoder, in a case where wiring is passed through the center of the scale or the like, the diameter of the scale is increased so that a pattern region, which is a region of the optical pattern, is extended. In the linear encoder, in a case where a stroke of the linear stage is lengthened with an increase in size of the machine tool or the like, the pattern region is extended. In a case where the M-sequence pattern is used, if the order of the M-sequence pattern is not increased, the pattern width per bit increases. In this case, if the light detection unit is not increased in size, the number of bits that can be detected by the light detection unit decreases, and if the number of bits required for decoding cannot be detected, the absolute position may be erroneously detected. In a case where the light detection unit is increased in size in order to keep the number of bits that can be detected, an increase in size of the configuration of the absolute encoder becomes a problem. Also, in a case where the order of the M-sequence pattern is increased, a similar pattern array is likely to occur so that the number of bits required for decoding increases. In this case, if a light receiving element is not increased in size, the redundancy of the pattern is reduced. In other words, error correction capability is reduced. That is, even in the case where the order of the M-sequence pattern is increased, if the light receiving element is not increased in size, there is a possibility that the similar pattern array is erroneously detected and that the absolute position is erroneously detected. Thus, in the case where the pattern region is extended, it has been required to achieve both downsizing of the configuration and high error correction capability.

As one of methods for achieving high error correction capability without increasing the size of the configuration, Patent Literature 1 proposes a method of providing two track patterns on a scale of a linear encoder. Patent Literature 1 discloses the linear encoder in which two M-sequence patterns are connected and placed in one of the two track patterns, and identification patterns for identifying corresponding ones of the two M-sequence patterns are set in the other of the two track patterns. In the identification patterns, regions corresponding to bits of “0” and “1” are set.

CITATION LIST

Patent Literature

Patent Literature 1: Japanese Patent Application Laid-open No. H4-160317

SUMMARY OF INVENTION

Problem to be Solved by the Invention

In the conventional technique disclosed in Patent Literature 1, when measurement is made near a boundary between the M-sequence patterns, the absolute position may be erroneously detected. For example, it is assumed that, in a case where the conventional technique is applied to a rotary encoder, the identification pattern of “0” corresponds to the M-sequence pattern from 0 degrees to 180 degrees, and the identification pattern of “1” corresponds to the M-sequence pattern from 180 degrees to 360 degrees. In this case, due to an error in detection of the identification pattern near the boundary between the two M-sequence patterns, an angle different from a correct angle by 180 degrees may be detected as the absolute position. Such an error can also occur in the linear encoder. Thus, according to the conventional technique, there has been a problem in that, due to the possible erroneous detection of the absolute position, it is difficult to detect the absolute position with high accuracy.

The present disclosure has been made in view of the above, and an object thereof is to provide an absolute encoder capable of detecting an absolute position with high accuracy.

Means to Solve the Problem

To solve the above problem and achieve an object, an absolute encoder according to the present disclosure includes: a scale including an optical pattern that includes code patterns for a plurality of cycles; an illumination unit to output light for illuminating the scale; a light detection unit to detect light from the scale receiving the light from the illumination unit, and output a signal corresponding to intensity of the light detected; a section determination unit to determine, for a region of the optical pattern divided into a plurality of sections, the section to which a code string belongs from among the plurality of the sections, the code string being read on the basis of the signal; and an absolute position calculation unit to obtain an absolute position of the scale on the basis of the section determined and the code string. When N is the number of the cycles of the code patterns on the scale, in a case where N is equal to two, the number of the sections in the region of the optical pattern is three or more, and in a case where N is equal to three or more, the number of the sections in the region of the optical pattern is N or more.

Effects of the Invention

The absolute encoder according to the present disclosure has an effect of being able to detect the absolute position with high accuracy.

DESCRIPTION OF EMBODIMENTS

Hereinafter, an absolute encoder and an electric motor according to embodiments will be described in detail with reference to the drawings.

First Embodiment

Figure 1:
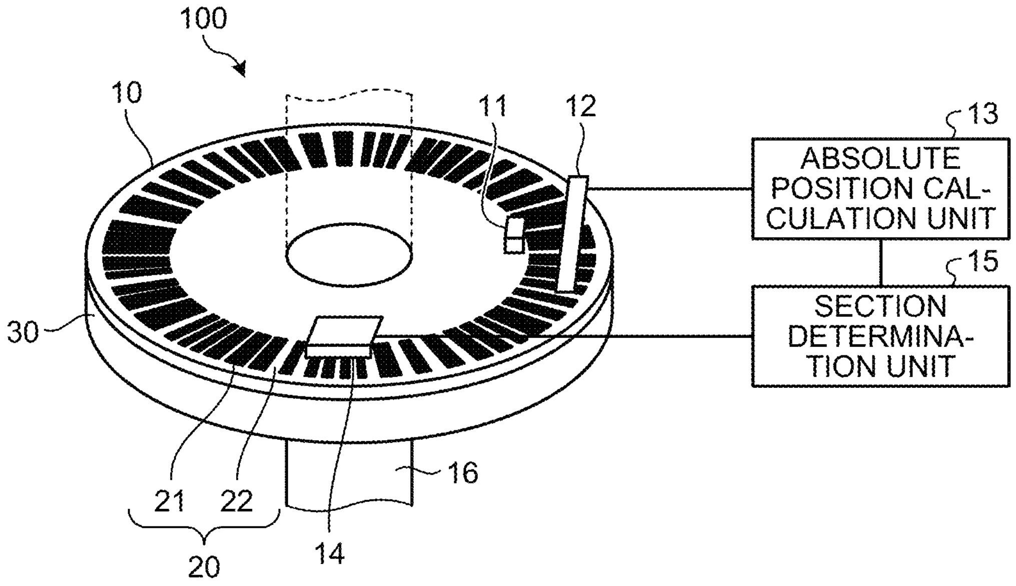
FIG. 1 is a diagram illustrating an example of a configuration of an absolute encoder according to a first embodiment.

FIG. 1 is a diagram illustrating an example of a configuration of an absolute encoder 100 according to a first embodiment. The absolute encoder 100 illustrated in FIG. 1 is a rotary encoder. The absolute encoder 100 includes a scale 10 including an optical pattern 20, a light emitting element 11 as an illumination unit, an image sensor 12 as a light detection unit, and a magnet 30. The absolute encoder 100 further includes an absolute position calculation unit 13, a magnetic sensor 14, and a section determination unit 15.

The light emitting element 11 outputs light for illuminating the scale 10. As the light emitting element 11, for example, a point source light emitting diode (LED) is used. The image sensor 12 detects light from the scale 10 that has received the light from the light emitting element 11, and outputs a signal corresponding to intensity of the light detected. As the image sensor 12, an imaging device such as a charge coupled device (CCD) image sensor or a complementary metal oxide semiconductor (CMOS) image sensor is used. The first embodiment describes an example in which the image sensor 12 is a one-dimensional image sensor, but the image sensor 12 may be a two-dimensional image sensor.

The divergent light emitted from the light emitting element 11 is reflected by the scale 10. The image sensor 12 receives the reflected light from the scale 10. Although FIG. 1 illustrates an example of a configuration not using an optical element such as a lens, an optical element that converges or diverges the light emitted from the light emitting element 11 or an optical element for image formation in the image sensor 12 may be used.

The scale 10 is attached to a shaft 16 of a motor or the like. A hole is formed at the center of the scale 10 that is circular. The shaft 16 passes through the hole of the scale 10. The absolute encoder 100 is a hollow rotary encoder that can be used with the shaft 16 passing through the center of the scale 10. The absolute encoder 100 is not limited to the hollow rotary encoder, and may be one in which no hole is formed in the scale 10. Note that in FIG. 1, a part of the shaft 16 is illustrated with a broken line.

A pattern region that is a region of the optical pattern 20 is provided on a circumferential portion of the scale 10. In the optical pattern 20, reflecting portions 21 and non-reflecting portions 22 are alternately formed in a circumferential direction. The optical pattern 20 is the pattern of only one track. In the track, code patterns of a plurality of cycles are formed. That is, the optical pattern 20 includes the code patterns of the plurality of cycles. The reflecting portions 21 are portions that reflect the light incident from the light emitting element 11. The non-reflecting portions 22 are portions that absorb the light incident from the light emitting element 11 or portions that transmit the light incident from the light emitting element 11. Alternatively, the non-reflecting portions 22 may be portions that reflect the light incident from the light emitting element 11 with a reflectance lower than a reflectance of the reflecting portions 21. The absolute encoder 100 uses the plurality of the reflecting portions 21 and the plurality of the non-reflecting portions 22 forming the optical pattern 20 to modulate a light intensity distribution projected onto the image sensor 12.

The code pattern of each cycle in the optical pattern 20 includes the reflecting portions 21 and the non-reflecting portions 22 arranged so as to characterize an angular position of the scale 10. The code pattern uses a code string in which a pseudo random code such as an M sequence is Manchester encoded. In the optical pattern 20, N pieces of M-sequence patterns are arranged in a range of 0 degrees to 360 degrees. That is, the number of cycles of the code patterns in the optical pattern 20 is N. Here, N is an integer of 2 or more. The order of the M-sequence pattern is "n". Here, a case where n=10 and N=2 will be described as an example. Each code pattern is the M-sequence pattern of a tenth-order, or 1024 bits.

Figure 2:
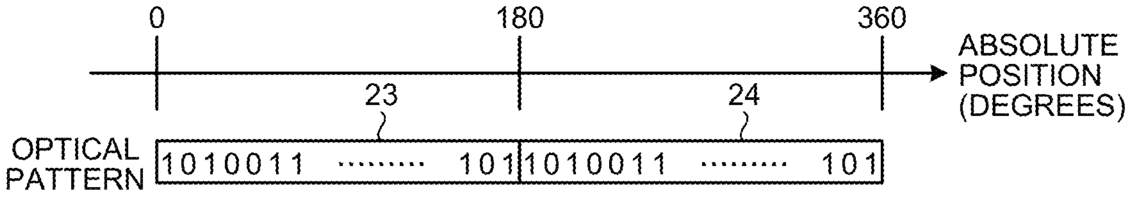
FIG. 2 is a diagram for explaining an optical pattern included in the absolute encoder according to the first embodiment.

FIG. 2 is a diagram for explaining the optical pattern 20 included in the absolute encoder 100 according to the first embodiment. FIG. 2 illustrates a relationship between the absolute position from 0 degrees to 360 degrees, that is, the angle from 0 degrees to 360 degrees, and the code patterns included in the optical pattern 20. In the example illustrated in FIG. 2, one M-sequence pattern is placed in the range of 0 degrees to 180 degrees, and one M-sequence pattern is placed in the range of 180 degrees to 360 degrees. In the example illustrated in FIG. 2, the M-sequence pattern corresponding to 0 degrees to 180 degrees is defined as a first code pattern 23, and the M-sequence pattern corresponding to 180 degrees to 360 degrees is defined as a second code pattern 24. The first code pattern 23 and the second code pattern 24 are code patterns identical to each other. That is, the code patterns of the cycles on the scale 10 are the code patterns identical to each other.

FIG. 1 illustrates, as the absolute encoder 100, a reflective encoder in which the light emitting element 11 and the image sensor 12 are both disposed on one side of the scale 10, but the absolute encoder is not limited to such an encoder. The absolute encoder 100 may be a transmissive encoder in which the light emitting element 11 and the image sensor 12 are disposed at positions facing each other with the scale 10 sandwiched therebetween. In the optical pattern 20 of the transmissive encoder, a transmissive portion that transmits light and a non-transmissive portion that blocks light are formed. For both the reflective type and the transmissive type, the optical pattern 20 need only be formed to be able to modulate the light intensity distribution projected onto the image sensor 12.

The scale 10 is formed by, for example, evaporating metal such as chromium onto a glass substrate and patterning a metal film using photolithography. In the reflective type, a portion where the metal film remains serves as the reflecting portion 21, and a portion where the metal film is removed serves as the non-reflecting portion 22. In the transmissive type, a portion where the metal film is removed serves as the transmissive portion, and a portion where the metal film remains serves as the non-transmissive portion. Note that as long as the reflecting portion 21 and the non-reflecting portion 22 or the transmissive portion and the non-transmissive portion can be formed, the material of the scale 10 and the method of creating the scale 10 are not particularly limited.

The absolute position calculation unit 13 is a calculation unit that calculates the absolute position of the scale 10 on the basis of a signal output from the image sensor 12. Details of processing by the absolute position calculation unit 13 will be described later.

Figure 3:
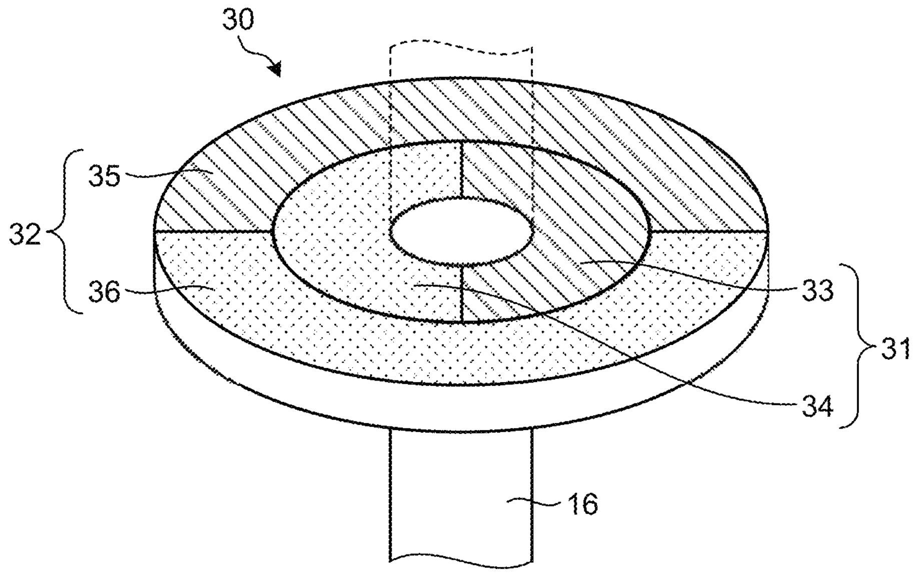
FIG. 3 is a diagram illustrating a magnet included in the absolute encoder according to the first embodiment.

FIG. 3 is a diagram illustrating the magnet 30 included in the absolute encoder 100 according to the first embodiment. The magnet 30 has a circular shape similar to that of the scale 10. As with the scale 10, a hole is formed at the center of the magnet 30. The shaft 16 passes through the hole of the magnet 30.

The magnet 30 includes two tracks. Of the two tracks, the track on a center side in a radial direction is referred to as a sine (sin) wave track 31, and the track in a circumferential portion of the magnet 30 is referred to as a cosine (cos) wave track 32. The sin wave track 31 is divided into two regions in a circumferential direction. One of the two regions is an N pole 33, and the other of the two regions is an S pole 34. The cos wave track 32 is divided into two regions in the circumferential direction. One of the two regions is an N pole 35, and the other of the two regions is an S pole 36. The N pole 35 and the S pole 36 of the cos wave track 32 are disposed to be 90 degrees out of phase with the N pole 33 and the S pole 34 of the sin wave track 31.

The scale 10 is attached to a surface of the magnet 30 so that the magnet 30 is integrated with the scale 10 and attached to the shaft 16. The magnet 30 is not limited to one integrated with the scale 10 in a way such that the scale 10 is attached to the magnet 30. The magnet 30 may be integrated with the scale 10 by a method such as integral molding. Also, the configuration of the magnet 30 is not limited to the above configuration.

The magnetic sensor 14 detects a magnetic field generated by the magnet 30 and outputs a signal corresponding to the magnitude of the magnetic field detected. As the magnetic sensor 14, a magneto resistive (MR) element or the like is used. The magnetic sensor 14 includes a sensor that detects the magnetic field of the sin wave track 31 and a sensor that detects the magnetic field of the cos wave track 32, and individually detects the magnetic field of the sin wave track 31 and the magnetic field of the cos wave track 32.

For the region of the optical pattern 20 divided into a plurality of sections, the section determination unit 15 determines the section to which a code string belongs from among the plurality of the sections, the code string being read on the basis of a signal from the image sensor 12. The section determination unit 15 makes the determination to determine, from among the code patterns of the plurality of cycles, the code pattern to which the read code string belongs. Details of the processing by the section determination unit 15 will be described later.

Next, processing of the absolute position calculation unit 13 for measuring the absolute position on the basis of the M-sequence pattern will be described. An image acquired by the image sensor 12 is converted from an analog signal to a digital signal by an analog to digital (AD) converter. The digital signal is input to the absolute position calculation unit 13. The AD converter is not illustrated.

Figure 4:
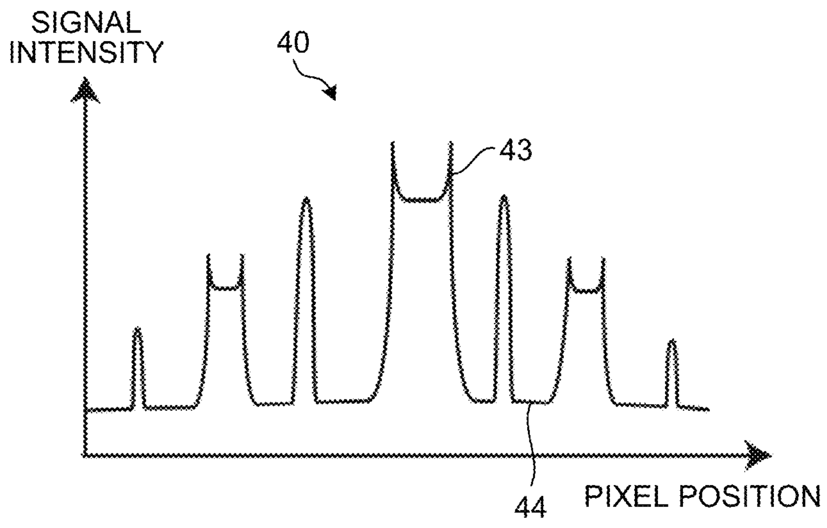
FIG. 4 is a graph illustrating an example of a waveform of a signal input to an absolute position calculation unit of the absolute encoder according to the first embodiment.

FIG. 4 is a graph illustrating an example of a waveform of the signal input to the absolute position calculation unit 13 of the absolute encoder 100 according to the first embodiment. A waveform 40 illustrated in FIG. 4 is an example of the waveform of the signal input to the absolute position calculation unit 13. In FIG. 4, the vertical axis represents signal intensity, and the horizontal axis represents a pixel position on the image sensor 12. The waveform 40 represents a light quantity distribution of the light detected by the image sensor 12.

A high bit 43 in the waveform 40 corresponds to the reflecting portion 21. A low bit 44 in the waveform 40 corresponds to the non-reflecting portion 22. Due to the influence of a light quantity distribution of the light emitted from the light emitting element 11, a variation in the gain of each pixel of the image sensor 12, or the like, the image of the optical pattern 20 projected onto the image sensor 12 has non-uniform light intensity for the high bit 43 and non-uniform light intensity for the low bit 44. The absolute position calculation unit 13 corrects the signal intensity illustrated in FIG. 4 so as to uniformize the signal intensity of the high bit 43 in each pixel and the signal intensity of the low bit 44 in each pixel.

Figure 5:
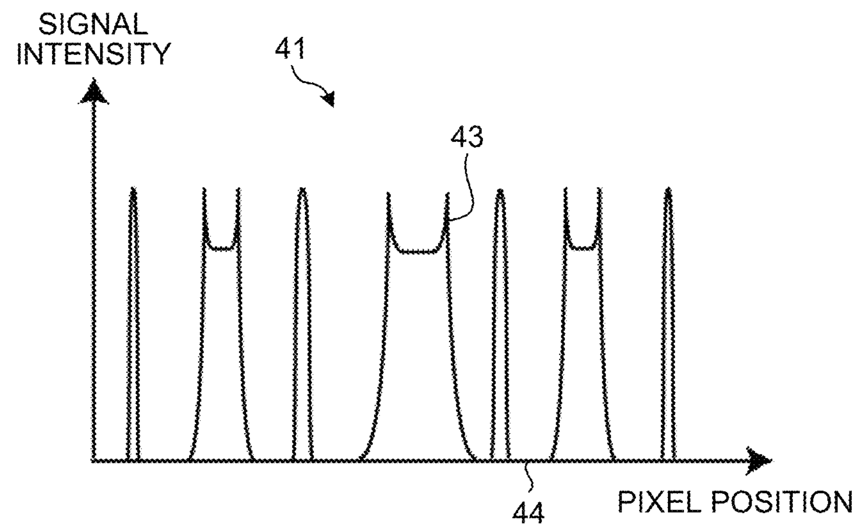
FIG. 5 is a graph illustrating an example of a waveform of a signal corrected by the absolute position calculation unit in the first embodiment.

FIG. 5 is a graph illustrating an example of a waveform of the signal corrected by the absolute position calculation unit 13 in the first embodiment. The absolute position calculation unit 13 corrects the signal intensity for each pixel on the basis of a light quantity correction value measured in advance. As a result, as illustrated in FIG. 5, a waveform 41 is obtained in which the signal intensity of the high bit 43 and the signal intensity of the low bit 44 have each been corrected to be uniform.

Figure 6:
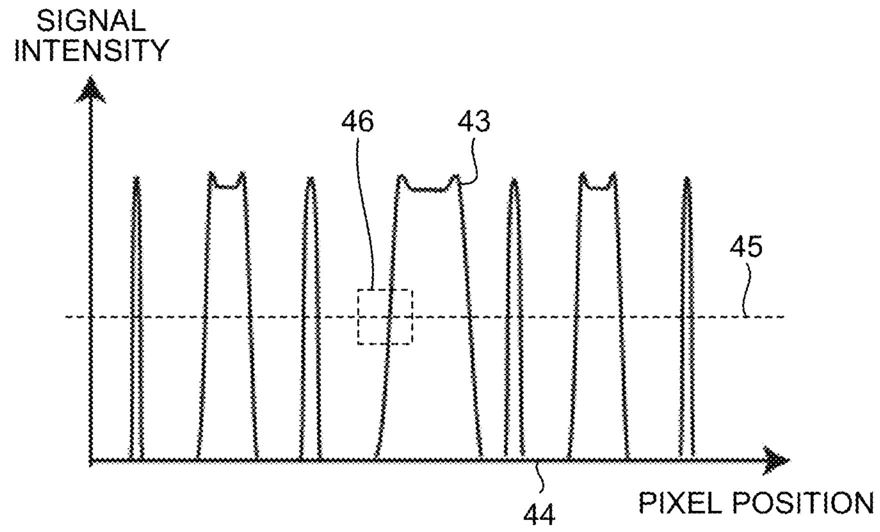
FIG. 6 is a graph illustrating an example of an edge position calculated by the absolute position calculation unit in the first embodiment.

FIG. 6 is a graph illustrating an example of an edge position calculated by the absolute position calculation unit 13 in the first embodiment. The absolute position calculation unit 13 obtains an edge pixel position 46, which is the edge position on the image sensor 12, on the basis of the waveform 41. The edge pixel position 46 is a position at which the signal intensity matches a threshold level 45 set in advance. The absolute position calculation unit 13 detects two pixels adjacent to each other so that one pixel has the signal intensity lower than the threshold level 45 and the other one has the signal intensity higher than the threshold level 45. The two pixel positions on both sides of the threshold level 45 are linearly interpolated, whereby the edge pixel position 46 whose signal intensity matches the threshold level 45 is obtained. Alternatively, the edge pixel position 46 may be obtained on the basis of two or more pixel positions on both sides of the threshold level 45. Yet alternatively, the edge pixel position 46 may be obtained not only by the linear interpolation but also by interpolation using a high-order function such as a quadratic function or a cubic function.

Figure 7:
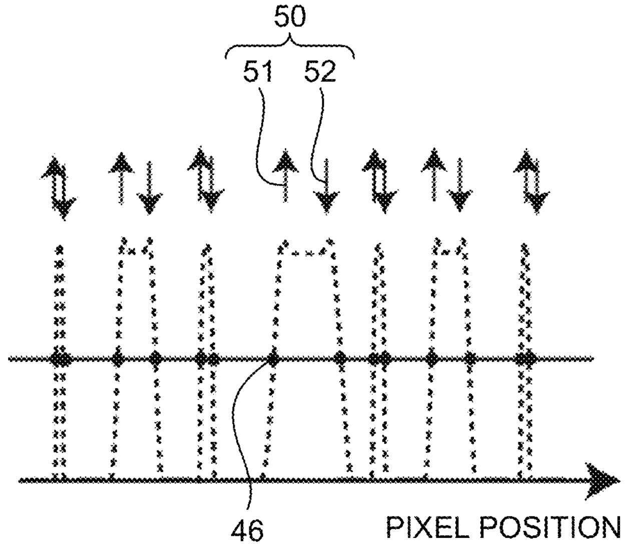
FIG. 7 is a diagram for explaining a rising edge and a falling edge detected by the absolute position calculation unit in the first embodiment.

FIG. 7 is a diagram for explaining a rising edge 51 and a falling edge 52 detected by the absolute position calculation unit 13 in the first embodiment. The absolute position calculation unit 13 detects the direction of an edge 50 at the edge pixel position 46 detected, thereby determining whether the edge 50 is the rising edge 51 or the falling edge 52. The absolute position calculation unit 13 performs such determination to detect the rising edge 51 and the falling edge 52.

For an i-th pixel and an (i+1)-th pixel that are two pixels on both sides of the threshold level 45, in a case where the signal intensity of the i-th pixel is lower than the signal intensity of the (i+1)-th pixel, the absolute position calculation unit 13 determines that the edge 50 is the rising edge 51. Here, "i" is a natural number. On the other hand, in a case where the signal intensity of the i-th pixel is higher than the signal intensity of the (i+1)-th pixel, the absolute position calculation unit 13 determines that the edge 50 is the falling edge 52.

Figure 8:
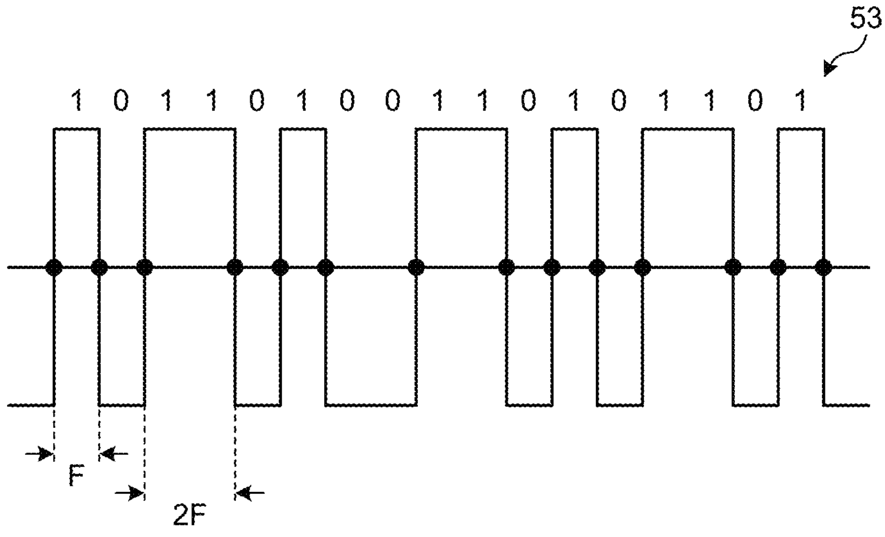
FIG. 8 is a diagram for explaining conversion from a signal to a bit string based on a direction of the edge and an edge pixel position in the first embodiment.

FIG. 8 is a diagram for explaining conversion from a signal to a bit string 53 based on the direction of the edge 50 and the edge pixel position 46 in the first embodiment. On the basis of the rising edge 51 and the falling edge 52 detected and the edge pixel position 46, the absolute position calculation unit 13 converts the high bit 43 and the low bit 44 into the bit string 53 including bit values of "0" and "1". For example, the absolute position calculation unit 13 generates the bit string 53 by associating a portion between the rising edge 51 to the falling edge 52 with the bit value "1" and associating a portion between the falling edge 52 to the rising edge 51 with the bit value "0". That is, the high bit 43 is expressed by the bit value "1", and the low bit 44 is expressed by the bit value "0".

In the first embodiment, the pseudo random code such as the M sequence is Manchester encoded so that, ideally, as illustrated in FIG. 8, when the same bit values are adjacent to each other, the number of the bit values in a row is two at the maximum. In the above description, the signal is converted into the bit string 53 on the basis of the direction of the edge 50 and the edge pixel position 46, but the method of converting the signal into the bit string 53 is not limited thereto. The absolute position calculation unit 13 may convert the signal into the bit string 53 by binarization processing as in the conventional technique. The absolute position calculation unit 13 may measure an ideal basic cycle width F for the pixel position in advance and correct the basic cycle width F. As a result, the absolute position calculation unit 13 can obtain the basic cycle width F that is uniform regardless of the pixel position.

Figure 9:
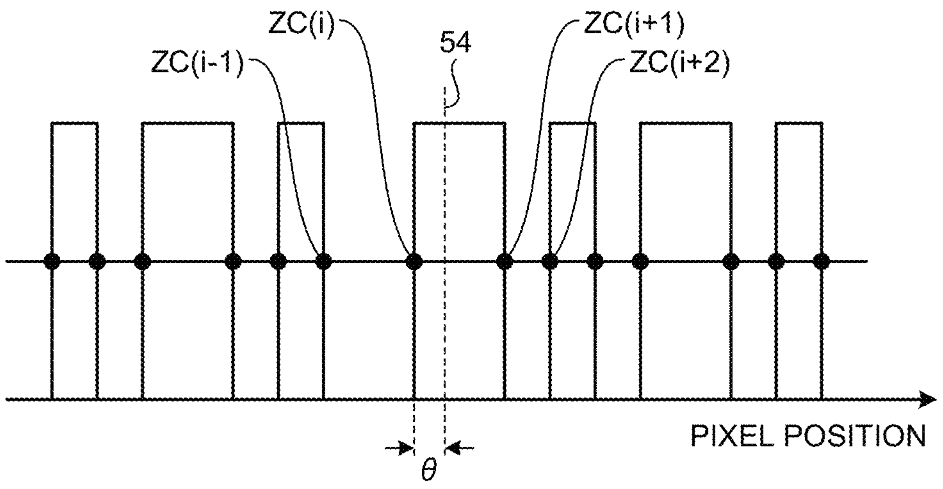
FIG. 9 is a diagram for explaining a method of detecting an absolute position from a bit string by the absolute position calculation unit in the first embodiment.

FIG. 9 is a diagram for explaining a method of detecting an absolute position from the bit string 53 by the absolute position calculation unit 13 in the first embodiment. The absolute position calculation unit 13 performs a rough detection calculation for detecting a rough absolute position. For example, a bit string included in the M-sequence pattern is stored in advance in a lookup table. The absolute position calculation unit 13 compares the bit string 53 detected with the bit string in the lookup table, thereby identifying the rough absolute position.

The absolute position calculation unit 13 calculates a phase shift amount θ by taking a difference between a reference pixel position 54 and the edge pixel position 46 that is closest to the reference pixel position 54. The reference pixel position 54 is a position of a reference pixel among the pixels of the image sensor 12. In the example illustrated in FIG. 9, an edge pixel position ZC (i) is the edge pixel position 46 closest to the reference pixel position 54. The method of calculating the phase shift amount θ is not limited to the method of taking the difference between the reference pixel position 54 and the edge pixel position ZC (i). The method of calculating the phase shift amount θ may be one based on a least squares method using a plurality of the edge pixel positions 46. The absolute position calculation unit 13 adds the phase shift amount θ to the calculated rough absolute position, thereby being able to calculate the absolute position of the scale 10.

Next, a problem caused by an increase in the diameter of the scale 10 will be described. On the scale 10, a portion where the optical pattern 20 is formed is assumed to have a radius R. Here, the optical pattern 20 is assumed to include the M-sequence pattern of the order "n". When "m" is the number of bits including the reflecting portions 21 and the non-reflecting portions 22 of the M-sequence pattern, then $m=2^n$ holds true. The line width F per bit is expressed by the following Formula (1).

$$F = 2R\pi/2^n \tag{1}$$

In the hollow rotary encoder as illustrated in FIG. 1, the radius R is increased as the diameter of the shaft 16 is increased. In a case where the order "n" is fixed, the line width F increases as the radius R is increased.

When "W" is the pixel width of the image sensor 12, "P" is the number of pixels of the image sensor 12, and "L" is the read length of the image sensor 12, then L=W×P holds true. The read length L is the length of a range that can be read by the image sensor 12, and is the length of a region in which the pixels are arranged in the image sensor 12. The number of bits $m_L$ in an image acquired by the image sensor 12 as illustrated in FIG. 4 is expressed by the following Formula (2).

$$m_L = L/F = W \times P \times 2^n/2R\pi \tag{2}$$

In a case where the read length L is fixed, the number of bits $m_L$ in the image decreases as the radius R is increased. As the number of bits mL decreases, the number of bits of the bit string 53 measured illustrated in FIG. 8 decreases. The decrease in the number of bits of the bit string 53 results in more cases where the bit string 53 and each of a plurality of the bit strings in the lookup table are similar in arrangement, which makes it difficult to identify the rough absolute position. Moreover, the decrease in the number of bits of the bit string 53 causes reduction in the error correction capability when the code pattern is broken due to adhesion of foreign matter to the optical pattern 20 or the like. The reduction in the error correction capability causes reduction in the performance of the encoder.

Meanwhile, in a case where the read length L is increased in order not to decrease the number of bits $m_L$ in the image, the image sensor 12 is increased in size so that the configuration of the encoder is increased in size. In a case where the number of pixels P is increased in order to increase the read length L, the reading speed of the image sensor 12 is reduced so that the measurement cycle of the encoder is extended. In addition, when the pixel width W is increased, the spatial resolution of the measured image is reduced, which makes it difficult to calculate the edge position with high accuracy and also possibly reduces the accuracy of calculating the absolute position.

In a case where the order "n" is increased in order not to decrease the number of bits $m_L$ in the image, the number of bits of the M-sequence pattern increases due to the relationship of $m=2^n$. In this case, since the line width F per bit decreases, the number of bits $m_L$ in the image increases without increasing the size of the image sensor 12. However, when the number of bits $m_L$ increases, the pattern in which "1" corresponding to the reflecting portion 21 and "0" corresponding to the non-reflecting portion 22 are arranged is likely to have a similar pattern. When the similar pattern is likely to occur, the error correction capability for the M-sequence pattern is reduced. In order not to reduce the error correction capability, it is necessary to increase the read length L in accordance with the order "n". As described above, when the radius R is increased, there is a problem that it is not possible to achieve both downsizing of the configuration and high error correction capability.

Figure 10:
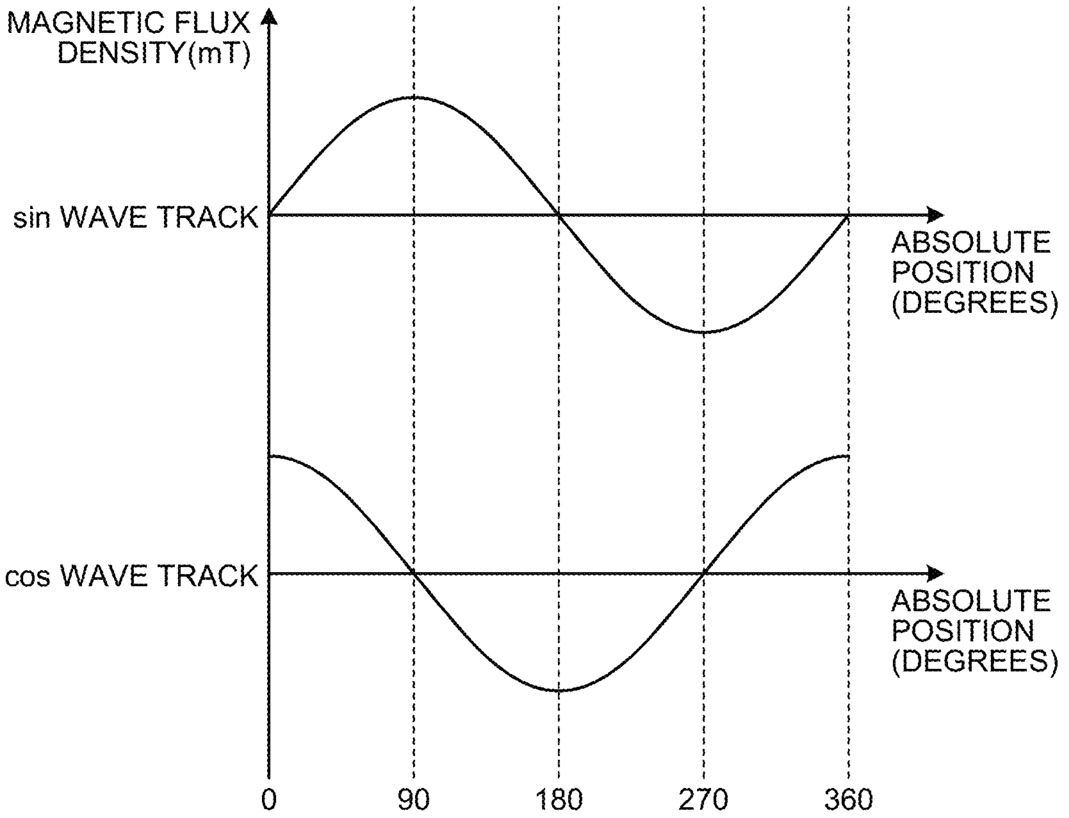
FIG. 10 is a graph illustrating changes in magnetic flux densities detected by a magnetic sensor in the first embodiment.

Next, an operation of the absolute encoder 100 for solving such a problem will be described. FIG. 10 is a graph illustrating changes in magnetic flux densities detected by the magnetic sensor 14 in the first embodiment. FIG. 10 illustrates the change in the magnetic flux density from the sin wave track 31 and the change in the magnetic flux density from the cos wave track 32. In the graph of FIG. 10, the vertical axis represents the magnetic flux density, and the horizontal axis represents the absolute position. For the magnetic flux density from the sin wave track 31, the magnetic flux density of the N pole 33 is set to positive, and the magnetic flux density of the S pole 34 is set to negative. For the magnetic flux density from the cos wave track 32, the magnetic flux density of the N pole 35 is set to positive, and the magnetic flux density of the S pole 36 is set to negative.

A waveform representing the magnetic flux density from the sin wave track 31 has a shape of a sin wave. A waveform representing the magnetic flux density from the cos wave track 32 has a shape of a cos wave. The waveform of the magnetic flux density from the sin wave track 31 is a sine wave of one cycle in a single rotation of the scale 10. The waveform of the magnetic flux density from the cos wave track 32 is a sine wave of one cycle in a single rotation of the scale 10. The waveform of the magnetic flux density from the cos wave track 32 is the sine wave that is 90 degrees out of phase with the waveform of the magnetic flux density from the sin wave track 31.

Each of the sin wave track 31 and the cos wave track 32 of the magnet 30 is magnetized such that the magnetic flux density changes sinusoidally. The magnet 30 is not limited to one magnetized such that the magnetic flux density changes sinusoidally. The waveform representing the change in the magnetic flux density may be other than the sine wave such as a rectangular wave.

The section determination unit 15 determines, on the basis of the result of detection of the magnetic field by the magnetic sensor 14, the section to which the code string belongs from among the plurality of the sections. With the magnet 30 being magnetized as illustrated in FIG. 3, the pattern region of the scale 10 is divided into four sections. In this case, the section determination unit 15 determines the section to which the code string belongs from among the four sections, the code string being read on the basis of the signal from the image sensor 12.

Here, the four sections are referred to as "first section", "second section", "third section", and "fourth section". The "first section" is a region corresponding to the N pole 33 of the sin wave track 31 and the N pole 35 of the cos wave track 32. The "second section" is a region corresponding to the N pole 33 of the sin wave track 31 and the S pole 36 of the cos wave track 32. The "third section" is a region corresponding to the S pole 34 of the sin wave track 31 and the S pole 36 of the cos wave track 32. The "fourth section" is a region corresponding to the S pole 34 of the sin wave track 31 and the N pole 35 of the cos wave track 32. The "first section" corresponds to an angular range of 0 degrees to 90 degrees of a single rotation. The "second section" corresponds to an angular range of 90 degrees to 180 degrees of a single rotation. The "third section" corresponds to an angular range of 180 degrees to 270 degrees of a single rotation. The "fourth section" corresponds to an angular range of 270 degrees to 360 degrees of a single rotation.

The section determination unit 15 determines, on the basis of the signal input from the magnetic sensor 14, the section to which the read code string belongs for each calculation cycle. The section determination unit 15 outputs information indicating the determined section to the absolute position calculation unit 13. Note that, here, the sin wave track 31 and the cos wave track 32 as signal tracks having one cycle for one rotation are used for determining the section, but the method of determining the section is not limited to such a method. A signal track having a plurality of cycles for one rotation may be used for determining the section. Moreover, the number of signal tracks used for determining the section is not limited to two. One or three or more signal tracks may be used for determining the section. The section determination unit 15 may use a counter to count up the output of the magnetic sensor 14 and determine the section using information on the counter. Also, although the magnet 30 and the magnetic sensor 14 are used for determining the section, the present disclosure is not limited thereto. As long as the section can be determined, something other than the magnet 30 and the magnetic sensor 14 may be used.

Figure 11:
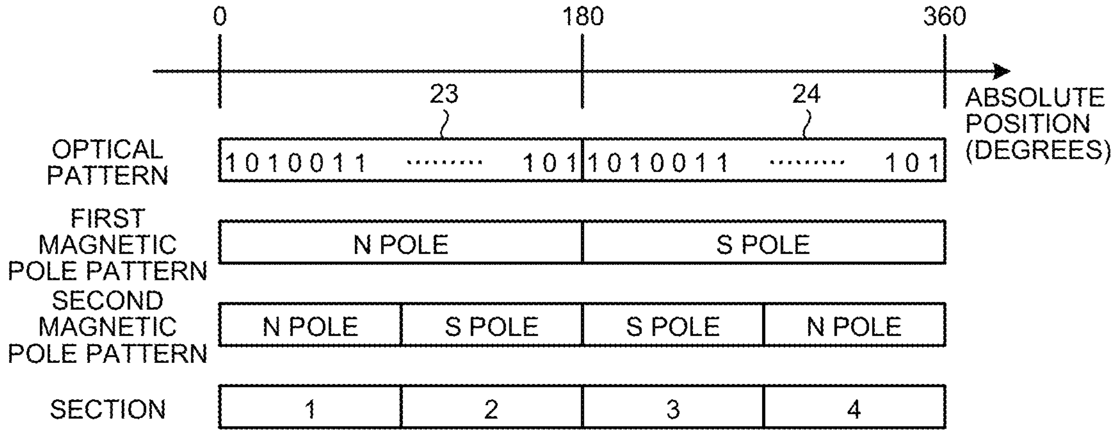
FIG. 11 is a diagram for explaining a first example of a relationship between an optical pattern and a section in the first embodiment.

The absolute position calculation unit 13 obtains the absolute position of the scale 10 on the basis of the section determined by the section determination unit 15 and the code string read on the basis of the signal from the image sensor 12. FIG. 11 is a diagram for explaining a first example of a relationship between the optical pattern 20 and the section in the first embodiment. A first magnetic pole pattern is a magnetic pole pattern of the sin wave track 31. A second magnetic pole pattern is a magnetic pole pattern of the cos wave track 32.

The first example illustrated in FIG. 11 is an example when the number of cycles N of the code patterns in the optical pattern 20 is two with the magnetic pole patterns of the magnet 30 being set as illustrated in FIG. 3. Moreover, the pattern region of the scale 10 is divided into four sections. The first example has such a configuration so that, even when the radius R is increased, the configuration is not increased in size and that high error correction capability can be achieved. Each of the first code pattern 23 and the second code pattern 24 is the M-sequence pattern of which the order "n" is 10. Note that each of first code pattern 23 and second code pattern 24 is a code pattern corresponding to one cycle in the optical pattern 20. The optical pattern 20 of the first example includes the code patterns corresponding to two cycles. That is, the optical pattern 20 of the first example is an optical pattern including the code patterns of a plurality of cycles.

Since the M-sequence patterns for the number of cycles N are formed in one track on the scale 10, the line width F per bit is expressed by the following Formula (3).

$$F = 2R\pi/(N \times 2^n) \tag{3}$$

According to Formula (3), with the M-sequence patterns of the N cycles formed in one track, the line width F can be reduced without increasing the order "n". Also, the number of bits mL in the image acquired by the image sensor 12 is expressed by the following Formula (4).

$$m_L = L/F = W \times P \times N \times 2^n/2R\pi \tag{4}$$

According to Formula (4), the number of bits mL in the image can be increased without increasing the order "n" or the read length L. Since the read length L need not be increased, the image sensor 12 does not need to be increased in size, so that it is possible to avoid an increase in size of the configuration of the absolute encoder 100.

However, reading the code sting on the basis of the signal from the image sensor 12 alone cannot discriminate in which M-sequence pattern among the M-sequence patterns of the cycles the code string is included. Therefore, in the first embodiment, the absolute encoder 100 uses the section determination unit 15 to determine, from among the M-sequence patterns of the plurality of cycles, the M-sequence pattern to which the read code string belongs.

In the case of the first example illustrated in FIG. 11, when the section determined by the section determination unit 15 is the "first section" or the "second section", the absolute position calculation unit 13 determines that the read code string is a code string included in the first code pattern 23. When the section determined by the section determination unit 15 is the "third section" or the "fourth section", the absolute position calculation unit 13 determines that the read code string is a code string included in the second code pattern 24.

The absolute encoder 100 uses the section determination unit 15 to determine the section, thereby being able to grasp a rough position of the absolute position. As a result, the absolute encoder 100 can discriminate in which M-sequence pattern, among the M-sequence patterns of the plurality of cycles, the code string read by the image sensor 12 is included. Even when the radius R is increased, the absolute encoder 100 can achieve high error correction capability without increasing the size of the configuration.

Note that in the first example illustrated in FIG. 11, the first code pattern 23 and the second code pattern 24 are the code patterns identical to each other, but the present disclosure is not limited thereto. The code patterns of the cycles may include a code pattern different from other code patterns. In the first embodiment, the "plurality of cycles" includes not only a case where exactly the same code pattern is repeated but also a case where a code pattern different from other code patterns is present. Similar pattern arrays may occur even in different code patterns, so that even in the case where the different code patterns are included, an effect similar to that in the case where the code patterns of the cycles are identical to each other may be obtained. When foreign matter adheres to the scale 10 or the image sensor 12, the number of bits in the image acquired by the image sensor 12 decreases, so that a code string similar to the read code string can occur. Also in this case, the section determination unit 15 determines the section, thereby capable of clearly discriminating in which M-sequence pattern among the M-sequence patterns of the plurality of cycles the code string is included.

Next, a relationship between the number of cycles N of the M-sequence patterns formed in one track on the scale 10 and the number of the sections will be described. In the first embodiment, when the number of cycles N is two, the number of the sections in the pattern region of the scale 10 is three or more, and when the number of cycles N is three or more, the number of the sections in the pattern region is N or more. The first example illustrated in FIG. 11 has N=2 and the number of the sections of four, and thus satisfies the requirement of the first embodiment.

Figure 12:
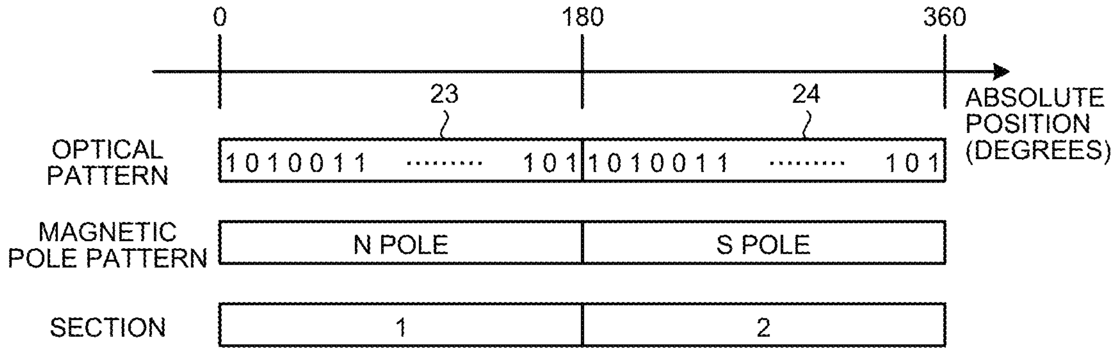
FIG. 12 is a diagram for explaining the relationship between the optical pattern and the section in a comparative example of the first embodiment.

FIG. 12 is a diagram for explaining the relationship between the optical pattern 20 and the section in a comparative example of the first embodiment. The comparative example illustrated in FIG. 12 is an example of a case where the above requirement of the first embodiment is not satisfied, and has N=2 and the number of the sections of two. The magnetic pole pattern is assumed to include only one sine wave pattern. The waveform representing the magnetic flux density is assumed to be a sine wave similar to the sine wave of the sin wave track 31 illustrated in FIG. 10. As with the first example of the first embodiment, the optical pattern 20 includes the first code pattern 23 and the second code pattern 24.

In the rotary encoder, 360 degrees corresponding to the last position of the second code pattern 24 coincides with 0 degrees corresponding to the first position of the first code pattern 23. When the scale 10 rotates a plurality of times with the first code pattern 23 and the second code pattern 24 being repeated, the absolute position can be calculated. Although the code string near 0 degrees and the code string near 180 degrees are identical to each other, on the basis of the result of determination of the section, the discrimination is made regarding which of the first code pattern 23 and the second code pattern 24 the code string is included in.

However, at each of 0 degrees and 180 degrees corresponding to boundaries between the code patterns, due to an error in the determination of the section, an angle different from a correct angle by 180 degrees may be detected as the absolute position. When the measured position corresponds to the boundary between the code patterns, the magnetic sensor 14 outputs zero as illustrated in FIG. 10. Since the magnetic sensor 14 outputs zero both when the measured position is 0 degrees and when the measured position is 180 degrees, it is difficult to discriminate whether the measured position is 0 degrees or 180 degrees. In this case, as the absolute position, an angle different by 180 degrees may be calculated.

In the case where one rotation is divided into two sections as in the comparative example, the boundary at the position of 0 degrees and the boundary at the position of 180 degrees are both boundaries between the "first section" and the "second section", so that an error may occur in the discrimination of the code pattern in which the code string is included. Near the boundary between the code patterns, due to a detection error by the magnetic sensor 14 and a resulting error in the positive/negative of the output from the magnetic sensor 14, the determination of the section can be erroneous. When an angle different from the correct angle by 180 degrees is calculated as the absolute position, a change occurs in driving of the motor or the like. As described above, in the case of the comparative example, the absolute position may be miscalculated near the boundary of the sections.

In the case of the first example illustrated in FIG. 11, among the boundaries between the code patterns, the boundary at the position of 0 degrees is the boundary between the "fourth section" and the "first section". Among the boundaries between the code patterns, the boundary at the position of 180 degrees is the boundary between the "second section" and the "third section". In the first embodiment, for the code string at the boundary between the sections adjacent to each other, the section determination unit 15 performs determination for each of the sections. The section determination unit 15 performs determination for the "fourth section" and the "first section" for the code string at the boundary corresponding to the position of 0 degrees. The section determination unit 15 performs determination for the "second section" and the "third section" for the code string at the boundary corresponding to the position of 180 degrees. By making such determinations, the section determination unit 15 can clearly discriminate in which of the first code pattern 23 and the second code pattern 24 the code strings at the positions of 0 degrees and 180 degrees are included.

In the second magnetic pole pattern, the position at 90 degrees where the magnetic poles are switched corresponds to the boundary between the "first section" and the "second section". In the second magnetic pole pattern, the position at 270 degrees where the magnetic poles are switched corresponds to the boundary between the "third section" and the "fourth section". The section determination unit 15 performs determination for the "first section" and the "second section" for the code string at the boundary corresponding to the position of 90 degrees. The section determination unit 15 performs determination for the "third section" and the "fourth section" for the code string at the boundary corresponding to the position of 270 degrees. By making such determinations, the section determination unit 15 can clearly discriminate in which of the first code pattern 23 and the second code pattern 24 the code strings at the positions of 90 degrees and 270 degrees are included.

Figure 13:
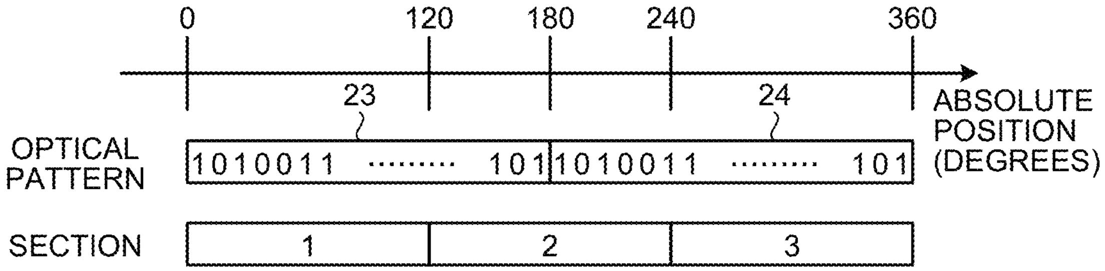
FIG. 13 is a diagram for explaining a second example of the relationship between the optical pattern and the section in the first embodiment.

FIG. 13 is a diagram for explaining a second example of the relationship between the optical pattern 20 and the section in the first embodiment. The second example illustrated in FIG. 13 has N=2 and the number of the sections of three, and thus satisfies the above requirement of the first embodiment.

In the case of the second example, among the boundaries between the code patterns, the boundary at the position of 0 degrees is the boundary between the "third section" and the "first section". Among the boundaries between the code patterns, the boundary at the position of 180 degrees is included in the "second section". The section determination unit 15 determines the section, thereby capable of clearly discriminating in which of the first code pattern 23 and the second code pattern 24 the code string positioned at the boundary is included. Also for the position at 120 degrees corresponding to the boundary between the "first section" and the "second section" and the position at 240 degrees corresponding to the boundary between the "second section" and the "third section", the section determination unit 15 can clearly discriminate in which of the first code pattern 23 and the second code pattern 24 the code string is included.

As described above, when the number of cycles N is two, the number of the sections is set to three or more so that the section determination unit 15 can clearly discriminate in which of the first code pattern 23 and the second code pattern 24 the code string positioned at the boundary of the sections is included. Even in a case where foreign matter adheres to the scale 10 or the image sensor 12, the section determination unit 15 can clearly discriminate in which M-sequence pattern among the M-sequence patterns of the plurality of cycles the code string is included.

Figure 14:
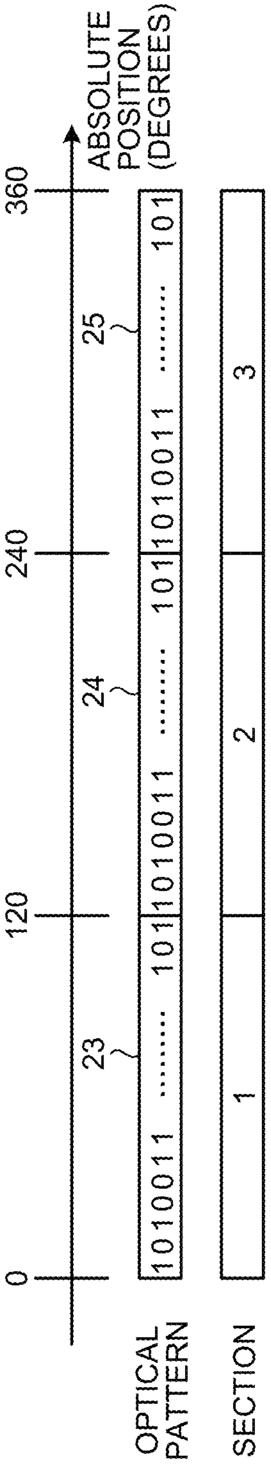
FIG. 14 is a diagram for explaining a third example of the relationship between the optical pattern and the section in the first embodiment.

FIG. 14 is a diagram for explaining a third example of the relationship between the optical pattern 20 and the section in the first embodiment. Each of the first code pattern 23, the second code pattern 24, and a third code pattern 25 is the M-sequence pattern of which the order "n" is 10. The third example illustrated in FIG. 14 has N=3 and the number of the sections of three, and thus satisfies the above requirement of the first embodiment.

In the case of the third example, among the boundaries between the code patterns, the boundary at the position of 0 degrees is the boundary between the "third section" and the "first section". Among the boundaries between the code patterns, the boundary at the position of 120 degrees is the boundary between the "first section" and the "second section". Among the boundaries between the code patterns, the boundary at the position of 240 degrees is the boundary between the "second section" and the "third section". The section determination unit 15 determines the section, thereby capable of clearly discriminating in which of the first code pattern 23, the second code pattern 24, and the third code pattern 25 the code string is included.

Figure 15:
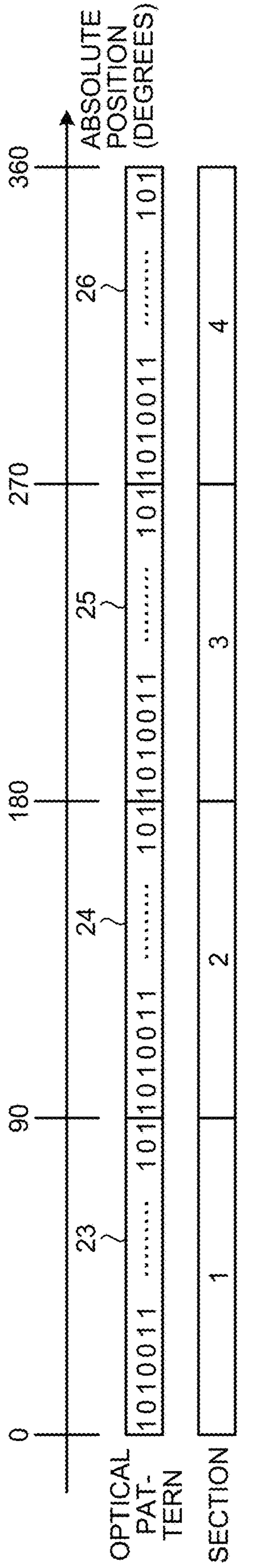
FIG. 15 is a diagram for explaining a fourth example of the relationship between the optical pattern and the section in the first embodiment.

FIG. 15 is a diagram for explaining a fourth example of the relationship between the optical pattern 20 and the section in the first embodiment. Each of the first code pattern 23, the second code pattern 24, the third code pattern 25, and a fourth code pattern 26 is the M-sequence pattern of which the order "n" is 10. The fourth example illustrated in FIG. 15 has N=4 and the number of the sections of four, and thus satisfies the above requirement of the first embodiment.

In the case of the fourth example, among the boundaries between the code patterns, the boundary at the position of 0 degrees is the boundary between the "fourth section" and the "first section". Among the boundaries between the code patterns, the boundary at the position of 90 degrees is the boundary between the "first section" and the "second section". Among the boundaries between the code patterns, the boundary at the position of 180 degrees is the boundary between the "second section" and the "third section". Among the boundaries between the code patterns, the boundary at the position of 270 degrees is the boundary between the "third section" and the "fourth section". The section determination unit 15 determines the section, thereby capable of clearly discriminating in which of the first code pattern 23, the second code pattern 24, the third code pattern 25, and the fourth code pattern 26 the code string is included.

As described above, when the number of cycles N is three or more, the number of the sections is set to N or more so that the section determination unit 15 can clearly discriminate in which code pattern among the plurality of the code patterns the code string positioned at the boundary of the sections is included. Even in a case where foreign matter adheres to the scale 10 or the image sensor 12, the section determination unit 15 can clearly discriminate in which M-sequence pattern among the M-sequence patterns of the plurality of cycles the code string is included.

In the first example to the fourth example, the boundary of the section is aligned with the boundary of the M-sequence pattern, but the boundary of the section need not be aligned with the boundary of the M-sequence pattern. The boundary of the section may be set to an arbitrary position other than the boundary of the M-sequence pattern. Even in the case where the boundary of the section is set to a position other than the boundary of the M-sequence pattern, the absolute encoder 100 can obtain a similar effect to the case where the boundary of the section is aligned with the boundary of the M-sequence pattern.

In the configuration illustrated in FIG. 1, the image sensor 12 and the magnetic sensor 14 are disposed at the different positions, but the image sensor 12 and the magnetic sensor 14 may be disposed on a single substrate. A circuit unit functioning as the absolute position calculation unit 13 and a circuit unit functioning as the section determination unit 15 may also be disposed on the same substrate as that on which the image sensor 12 and the magnetic sensor 14 are disposed. Although the absolute position is calculated on the basis of the M-sequence pattern placed in one track, the method of calculating the absolute position by the absolute position calculation unit 13 is not limited thereto. The absolute position calculation unit 13 can calculate the absolute position by any method. The first embodiment has been described with the absolute encoder 100 being the rotary encoder as an example, but the configuration and processing described in the first embodiment may be applied to a linear encoder.

According to the first embodiment, when the number of cycles N is two, the number of the sections in the pattern region is three or more, and when the number of cycles N is three or more, the number of the sections in the pattern region is N or more. By satisfying such a requirement, the absolute encoder 100 can clearly discriminate in which M-sequence pattern, among the M-sequence patterns of the plurality of cycles, the read code string is included. Even when the radius R is increased, the absolute encoder 100 can achieve high error correction capability without increasing the size of the configuration, and can detect the absolute position with high accuracy by reducing the error in the detection of the absolute position. The absolute encoder 100 thus has the effect of being able to detect the absolute position with high accuracy.

Second Embodiment

Figure 16:
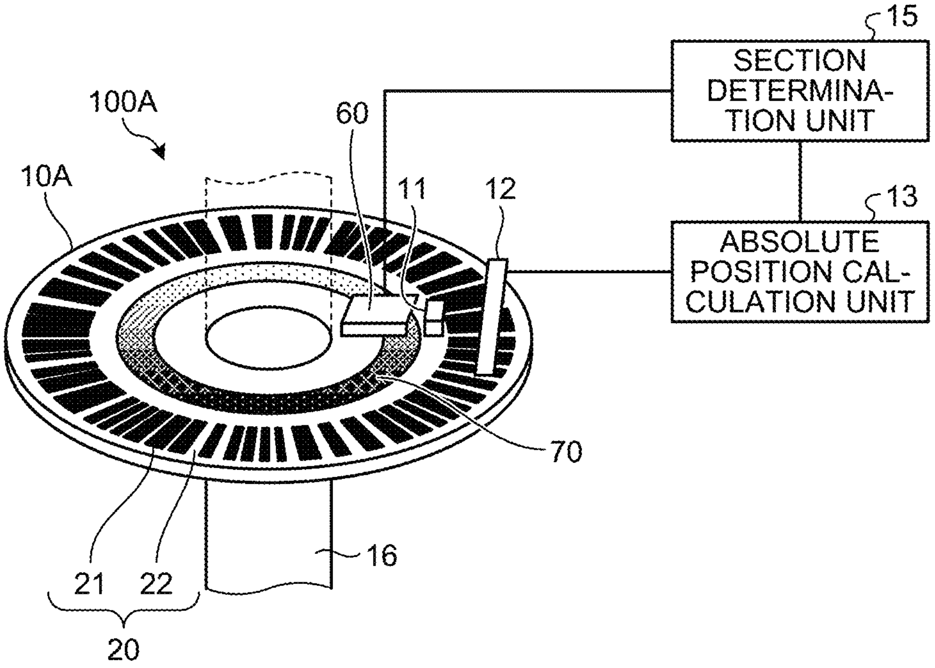
FIG. 16 is a diagram illustrating an example of a configuration of an absolute encoder according to a second embodiment.

A second embodiment will describe an example in which a signal different from that in the first embodiment is used to determine a section. FIG. 16 is a diagram illustrating an example of a configuration of an absolute encoder 100A according to the second embodiment. In the second embodiment, the components identical to those in the above first embodiment are denoted by the same reference numerals as those assigned to such components in the first embodiment, and a configuration different from that of the first embodiment will be mainly described.

The absolute encoder 100A includes a scale 10A different from the scale 10 of the first embodiment. On the scale 10A, an optical track 70 is formed in which the intensity of light changes for each section. The absolute encoder 100A includes a light receiving unit 60 that detects the light from the optical track 70. The magnetic sensor 14 and the magnet 30 described in the first embodiment are not included in the absolute encoder 100A.

Figure 17:
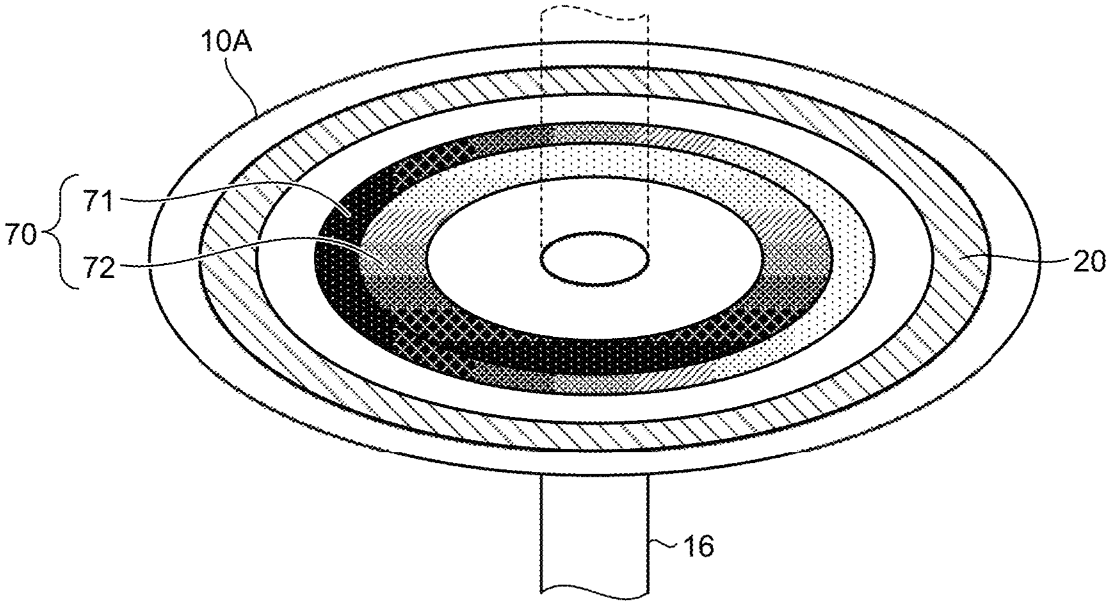
FIG. 17 is a diagram illustrating a scale included in the absolute encoder according to the second embodiment.

FIG. 17 is a diagram illustrating the scale 10A included in the absolute encoder 100A according to the second embodiment. On the scale 10A, the optical pattern 20 similar to that of the first embodiment is formed. In FIG. 17, the reflecting portions 21 and the non-reflecting portions 22 of the optical pattern 20 are not illustrated.

The optical track 70 is formed closer to the center than the optical pattern 20 in the plane of the scale 10A. The optical track 70 includes two tracks. The track on a circumferential side between the two tracks is referred to as a sin wave track 71, and the track on a center side between the two tracks is referred to as a cos wave track 72. Each of the sin wave track 71 and the cos wave track 72 is configured such that the reflectance gradually changes at each position in a circumferential direction. The reflectance of the sin wave track 71 at each position in the circumferential direction is represented by a waveform similar to the waveform of the sin wave track 31 illustrated in FIG. 10. The reflectance of the cos wave track 72 at each position in the circumferential direction is represented by a waveform similar to the waveform of the cos wave track 32 illustrated in FIG. 10.

Each of the sin wave track 71 and the cos wave track 72 of the optical track 70 is configured such that the reflectance changes sinusoidally. Each of the sin wave track 71 and the cos wave track 72 is not limited to one configured such that the reflectance changes sinusoidally. The waveform representing the change in the reflectance may be other than the sine wave such as a rectangular wave.

Figure 18:
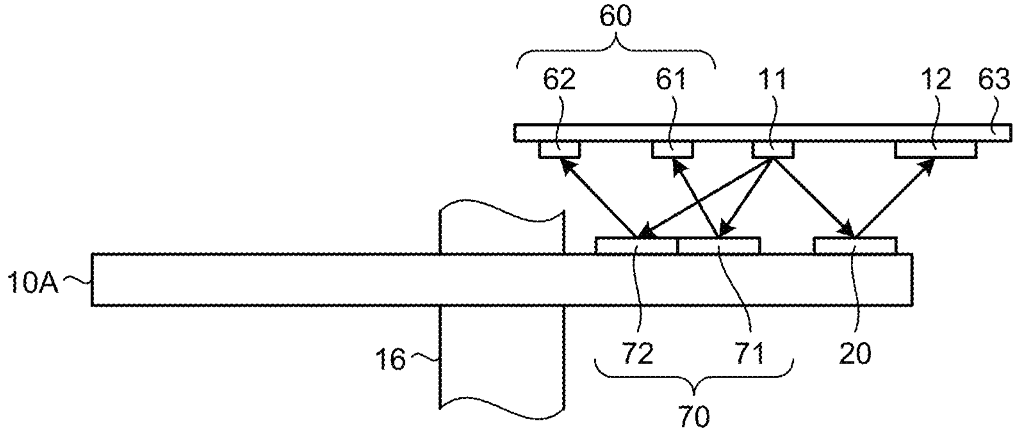
FIG. 18 is a diagram illustrating the scale and a configuration disposed to face the scale in the absolute encoder according to the second embodiment.

FIG. 18 is a diagram illustrating the scale 10A and a configuration disposed to face the scale 10A in the absolute encoder 100A according to the second embodiment. FIG. 18 is a plan view parallel to a center line of the shaft 16 and one diameter of the scale 10A.

The light emitting element 11 serves as both a light source for illuminating the optical pattern 20 and a light source for illuminating the optical track 70. The light receiving unit 60 includes two light receiving elements 61 and 62. The light receiving element 61 receives reflected light from the sin wave track 71. The light receiving element 62 receives reflected light from the cos wave track 72. The light emitting element 11, the image sensor 12, and the light receiving unit 60 are mounted on a common substrate 63 and disposed at positions facing the scale 10A. The light emitting element 11, the image sensor 12, and the light receiving unit 60 are mounted on the common substrate 63 so that the configuration of the absolute encoder 100A can be downsized. The image sensor 12 and the light receiving unit 60 share the light emitting element 11, and thus the absolute encoder 100A can reduce the number of parts and downsize the configuration.

The light receiving element 61 detects the reflected light from the sin wave track 71, and outputs a signal corresponding to intensity of the reflected light detected to the section determination unit 15. The light receiving element 62 detects the reflected light from the cos wave track 72, and outputs a signal corresponding to intensity of the reflected light detected to the section determination unit 15. The section determination unit 15 determines the section on the basis of the signal that has been input. That is, the section determination unit 15 determines the section on the basis of a result of detecting the intensity of the light from the optical track 70. The section determination unit 15 obtains the signal having a waveform similar to the waveform of the sin wave track 31 illustrated in FIG. 10 and the signal having a waveform similar to the waveform of the cos wave track 32 illustrated in FIG. 10. The section determination unit 15 can thus determine the section as in the case of the first embodiment. As in the case of the first embodiment, even in a case where the radius R is increased, the absolute encoder 100A can achieve high error correction capability without increasing the size of the configuration, and can detect the absolute position with high accuracy by reducing an error in the detection of the absolute position.

FIG. 16 illustrates, as the absolute encoder 100A, a reflective encoder in which the light emitting element 11, the image sensor 12, and the light receiving unit 60 are all disposed on one side of the scale 10A, but the absolute encoder is not limited to such an encoder. The absolute encoder 100A may be a transmissive encoder in which the light emitting element 11, the image sensor 12, and the light receiving unit 60 are disposed at positions facing each other with the scale 10A sandwiched therebetween. In this case, each of the sin wave track 71 and the cos wave track 72 is configured such that the transmittance gradually changes at each position in the circumferential direction. The light receiving element 61 detects light transmitted through the sin wave track 71, and outputs a signal corresponding to intensity of the detected light to the section determination unit 15. The light receiving element 62 detects light transmitted through the cos wave track 72, and outputs a signal corresponding to intensity of the detected light to the section determination unit 15. The optical track 70 only needs to be configured such that the section can be determined by the section determination unit 15, and the configuration of the optical track 70 is not limited to the configuration described in the second embodiment.

Third Embodiment

Figure 19:
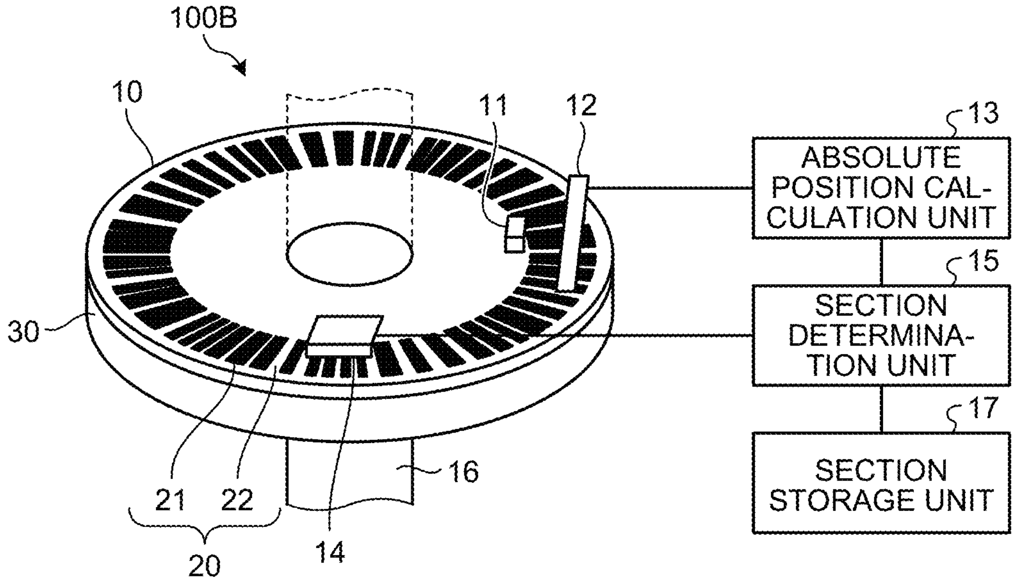
FIG. 19 is a diagram illustrating an example of a configuration of an absolute encoder according to a third embodiment.

A third embodiment is different from the first and second embodiments in that information indicating a section is saved, and whether or not a determined section is erroneous is checked on the basis of the information saved. FIG. 19 is a diagram illustrating an example of a configuration of an absolute encoder 100B according to the third embodiment. In the third embodiment, the components identical to those in the above first or second embodiment are denoted by the same reference numerals as those assigned to such components in the first or second embodiment, and a configuration different from that of the first or second embodiment will be mainly described.

The absolute encoder 100B is obtained by adding a section storage unit 17 to a configuration similar to that of the absolute encoder 100 of the first embodiment. The section storage unit 17 stores section information that is information indicating a result of determination of the section by the section determination unit 15. Note that the absolute encoder 100B is not limited to one obtained by adding the section storage unit 17 to the configuration similar to that of the absolute encoder 100 of the first embodiment. The absolute encoder 100B may be obtained by adding the section storage unit 17 to a configuration similar to that of the absolute encoder 100A of the second embodiment.

Next, section determination using the section information will be described. In a first calculation cycle after the absolute encoder 100B is powered on, the absolute encoder 100B calculates the absolute position as in the case of the first or second embodiment. The section determination unit 15 determines the section as in the case of the first or second embodiment. The section determination unit 15 outputs the section information indicating the result of determination of the section to each of the absolute position calculation unit 13 and the section storage unit 17. The absolute encoder 100B saves the section information by storing the section information in the section storage unit 17.

In a later calculation cycle than the first calculation cycle after the absolute encoder 100B is powered on, the section determination unit 15 reads the section information from the section storage unit 17. Moreover, the section determination unit 15 determines the section as in the case of the first or second embodiment. The section determination unit 15 compares the section determined this time with the section indicated by the section information. When the section determined this time is the same as the section indicated by the section information or when the section determined this time is a section next to the section indicated by the section information, the section determination unit 15 adopts the determined section as the result of determination this time. On the other hand, when the section determined this time is a section positioned away from the section indicated by the section information, the section determination unit 15 determines that the section determined this time is erroneous. In this case, the section determination unit 15 adopts the section indicated by the section information as the result of determination this time.

As described above, on the basis of the section information indicating the result of determination of the section in a second calculation cycle preceding a first calculation cycle in which the section is determined, the section determination unit 15 detects an error in the determination in the first calculation cycle. The first calculation cycle is the calculation cycle in which the section is determined this time. The second calculation cycle is the calculation cycle immediately preceding the first calculation cycle. The section determination unit 15 outputs section information indicating the result of determination this time to each of the absolute position calculation unit 13 and the section storage unit 17. The section information saved in the section storage unit 17 is updated to section information adopted for each calculation cycle.

The absolute encoder 100B uses the section determination unit 15 to detect the error in the determination of the section, thereby being able to reduce an error in detection of the absolute position. As a result, the absolute encoder 100B can detect the absolute position with high accuracy.

Note that, in the above description, the determined section is adopted when the determined section is the same as the section determined last time or is the section next to the section determined last time, but the method of determining whether or not to adopt the determined section is not limited thereto. In the above description, the section information saved in the section storage unit 17 is updated to the section information adopted for each calculation cycle so that only the last section information is saved, but the present disclosure is not limited thereto. The section storage unit 17 may save pieces of section information in a plurality of calculation cycles. The section determination unit 15 may compare the section determined this time with pieces of section information in a plurality of past calculation cycles. In the above description, in the first calculation cycle after the absolute encoder 100B is powered on, the section determined this time is not compared with the section determined last time, but the present disclosure is not limited thereto. The section determination unit 15 may read the section information saved in the section storage unit 17 during the last operation of the absolute encoder 100B, and compare the read section information with the section determined this time.

Next, an example of operation of the section determination unit 15 and the section storage unit 17 of the third embodiment will be described. In the example of operation of the third embodiment, on the basis of the section information indicating the result of determination of the section in the second calculation cycle and the speed of the scale 10, the section determination unit 15 detects an error in the determination in the first calculation cycle.

When "v" is the current speed of the scale 10 and "τ" is the calculation cycle, a displacement D of the scale 10 in the calculation cycle is expressed by the following Formula (5).

$$D = v \times \tau \tag{5}$$

The section determination unit 15 reads the section information from the section storage unit 17 and acquires speed information of the scale 10. On the basis of the calculation cycle T and the speed "v" that is indicated in the speed information, the section determination unit 15 obtains the displacement D from when the section is determined last time to the present. On the basis of the section indicated in the section information and the displacement D, the section determination unit 15 detects an error in the determination of the section. The section determination unit 15 uses the section information and the displacement D, thereby capable of detecting the error in the determination of the section with higher accuracy.

The section determination unit 15 acquires a calculated result of the absolute position in the last calculation cycle and adds the displacement D to the calculated result of the absolute position, thereby being able to estimate a current absolute position. The section determination unit 15 may compare a current section, which is obtained from the result of estimating the current absolute position, with the determined section to detect the error in the determination of the section. In this case as well, the section determination unit 15 can detect the error in the determination of the section with higher accuracy. A method of detecting the error in the determination of the section need only be a method using the section information saved, and is not limited to the method described above.

Next, a description will be made of a hardware configuration for implementing the absolute position calculation unit 13, the section determination unit 15, and the section storage unit 17 that are functional units of the absolute encoders 100, 100A, and 100B according to the first to third embodiments. The functional units of the absolute encoders 100, 100A, and 100B are implemented by processing circuitry. The processing circuitry may be circuitry in which a processor executes software, or may be dedicated circuitry.

Figure 20:
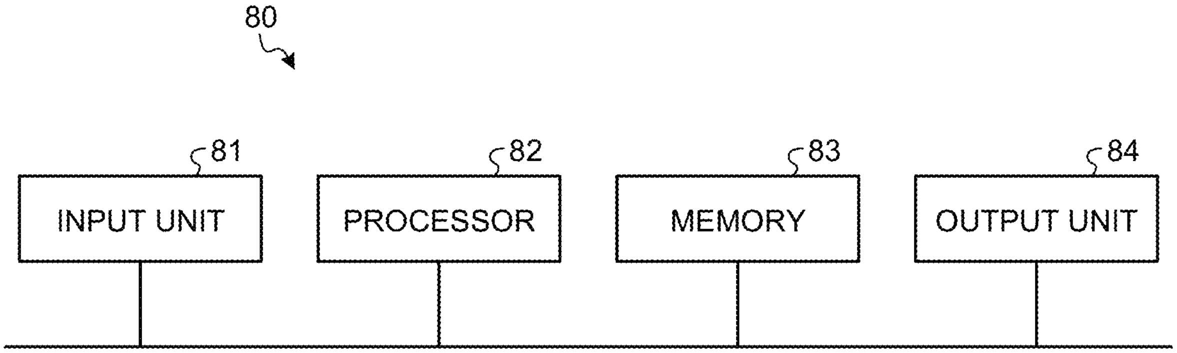
FIG. 20 is a diagram illustrating an example of a configuration of a control circuit according to the first to third embodiments.

In a case where the processing circuitry is implemented by the software, the processing circuitry is, for example, a control circuit 80 illustrated in FIG. 20. FIG. 20 is a diagram illustrating an example of a configuration of the control circuit 80 according to the first to third embodiments. The control circuit 80 includes an input unit 81, a processor 82, a memory 83, and an output unit 84.

The input unit 81 is an interface circuit that receives data input from the outside of the control circuit 80 and gives the data to the processor 82. The output unit 84 is an interface circuit that sends data from the processor 82 or the memory 83 to the outside of the control circuit 80. When the processing circuitry is the control circuit 80 illustrated in FIG. 20, the processor 82 reads and executes a program stored in the memory 83, thereby implementing the absolute position calculation unit 13, the section determination unit 15, and the section storage unit 17 that are the functional units of the absolute encoders 100, 100A, and 100B. The program stored in the memory 83 is the program corresponding to the absolute position calculation unit 13, the section determination unit 15, and the section storage unit 17. The processor 82 also outputs data such as a calculated result to a volatile memory of the memory 83. The memory 83 is also used as a temporary memory for each processing executed by the processor 82. The processor 82 may output the data such as the calculated result to the memory 83 and store the data therein, or may store the data such as the calculated result in an auxiliary storage device via the volatile memory of the memory 83. The function of the section storage unit 17 is implemented by the use of the memory 83 or the auxiliary storage device.

The processor 82 is a central processing unit (CPU), which is also referred to as a central processor, a processing unit, an arithmetic unit, a microprocessor, a microcomputer, a processor, or a digital signal processor (DSP). The memory 83 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

Figure 21:
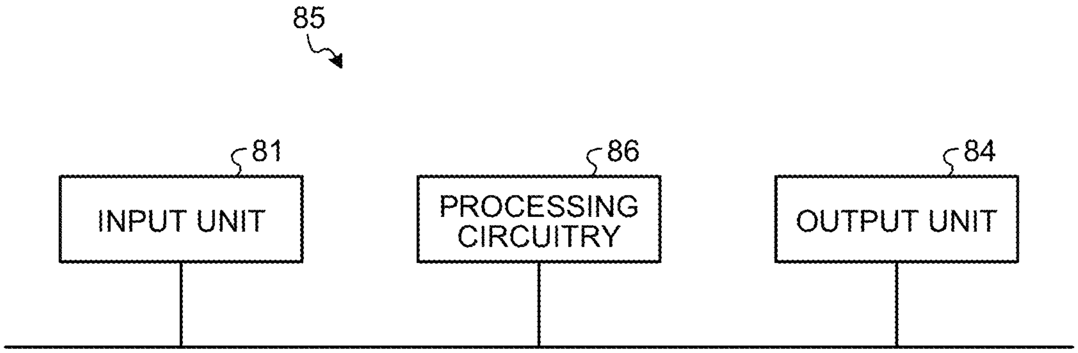
FIG. 21 is a diagram illustrating an example of a configuration of a hardware circuit that is dedicated according to the first to third embodiments.

FIG. 20 is the example of the hardware in the case where the functional units of the absolute encoders 100, 100A, and 100B are implemented by the processor 82 and the memory 83 that are for general purpose use, but the functional units of the absolute encoders 100, 100A, and 100B may be implemented by a hardware circuit that is dedicated. FIG. 21 is a diagram illustrating an example of a configuration of a hardware circuit 85 that is dedicated according to the first to third embodiments.

The hardware circuit 85 that is dedicated includes the input unit 81, the output unit 84, and a processing circuit 86. The processing circuit 86 is a single circuit, a complex circuit, a programmed processor, a parallel-programmed processor, an application specific integrated circuit (ASIC), a field programmable gate array (FPGA), or a circuit obtained by combining these. Note that the functional units of the absolute encoders 100, 100A, and 100B may be implemented by a combination of the control circuit 80 and the hardware circuit 85.

Fourth Embodiment

Figure 22:
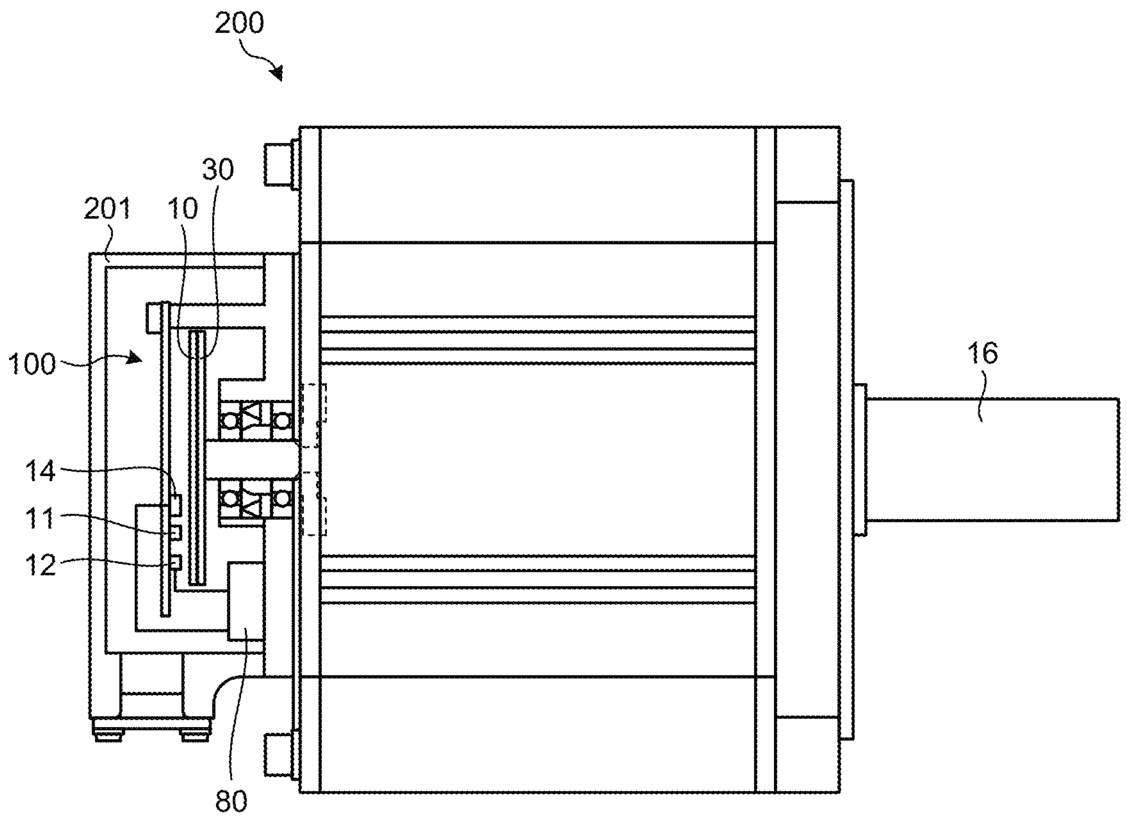
FIG. 22 is a diagram illustrating an example of a configuration of a rotary motor according to a fourth embodiment.

A fourth embodiment will describe an example in which an absolute encoder is applied to a rotary motor that is an electric motor. FIG. 22 is a diagram illustrating an example of a configuration of a rotary motor 200 according to the fourth embodiment. In the fourth embodiment, the components identical to those in the above first to third embodiments are denoted by the same reference numerals as those assigned to such components in the first to third embodiments, and a configuration different from that of the first to third embodiments will be mainly described. Note that the following description illustrates a case where the absolute encoder 100 according to the first embodiment is used for the rotary motor 200, but the absolute encoder 100A or 100B according to the second or third embodiment may be used for the rotary motor 200.

The shaft 16 is provided at the center of rotation of a rotor disposed inside an outer shell of the rotary motor 200. The shaft 16 is disposed so as to protrude outside the outer shell, and transmits a driving force generated inside the outer shell to the outside of the outer shell. Inside the outer shell of the rotary motor 200, a stator and a bearing that rotatably supports the shaft 16 are provided.

The absolute encoder 100 is provided at an end portion on a non-load side of the outer shell of the rotary motor 200. The scale 10 is connected to an end portion on a non-load side of the shaft 16. Note that the scale 10 may be connected to the shaft 16 with the shaft 16 passing through the center of the scale 10 as illustrated in FIG. 1. The absolute encoder 100 is covered with a cap 201 attached to the outer shell of the rotary motor 200. FIG. 22 schematically illustrates the components housed inside the cap 201.

Although FIG. 22 illustrates the control circuit 80 functioning as the absolute position calculation unit 13 and the section determination unit 15, the absolute encoder 100 may be provided with the hardware circuit 85 instead of the control circuit 80, or may be provided with a combination of the control circuit 80 and the hardware circuit 85.

The rotary motor 200 includes the absolute encoder 100, thereby capable of detecting the absolute position with high accuracy. The rotary motor 200 capable of detecting the absolute position with high accuracy can achieve high reliability.

Fifth Embodiment

Figure 23:
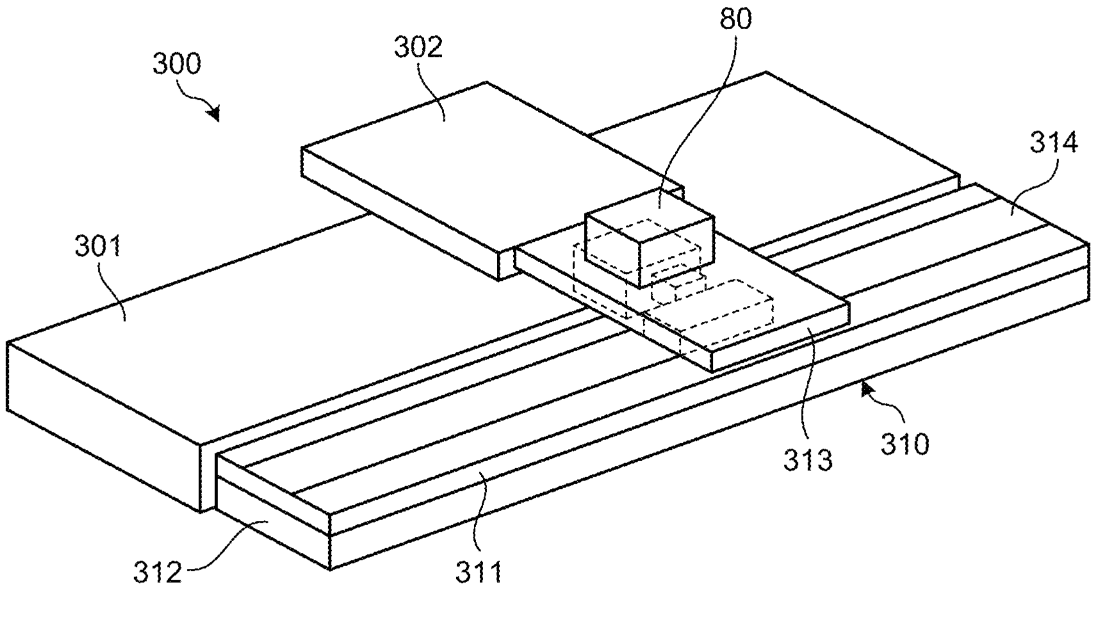
FIG. 23 is a diagram illustrating an example of a configuration of a linear motor according to a fifth embodiment.

A fifth embodiment will describe an example in which an absolute encoder is applied to a linear motor that is an electric motor. FIG. 23 is a diagram illustrating an example of a configuration of a linear motor 300 according to the fifth embodiment. In the fifth embodiment, the components identical to those in the above first to fourth embodiments are denoted by the same reference numerals as those assigned to such components in the first to fourth embodiments, and a configuration different from those of the first to fourth embodiments will be mainly described.

The linear motor 300 includes a stator 301 and a linear stage 302 as a mover. The stator 301 generates an electromagnetic field by energization of a coil of the stator 301. The linear motor 300 uses the action of a magnet of the linear stage 302 and the electromagnetic field to move the linear stage 302 in a linear direction.

The linear motor 300 includes an absolute encoder 310 that is a linear encoder. The absolute encoder 310 is obtained by modifying the absolute encoder 100 according to the first embodiment to match the linear configuration, and includes features similar to those of the absolute encoder 100. Note that the linear motor 300 may use, instead of the absolute encoder 310, an absolute encoder including features similar to those of the absolute encoder 100A or 100B according to the second or third embodiment.

The absolute encoder 310 includes a scale 311 and a magnet 312 integrated with each other. The scale 311 and the magnet 312 integrated with each other extend in a linear direction. The scale 311 and the magnet 312 are installed where the stator 301 is installed. The scale 311 includes an optical pattern 314. In the optical pattern 314, the reflecting portion 21 and the non-reflecting portion 22 similar to those in FIG. 1 are formed. The reflecting portion 21 and the non-reflecting portion 22 are arranged in the linear direction. In FIG. 23, the reflecting portion 21 and the non-reflecting portion 22 are not illustrated.

Figure 24:
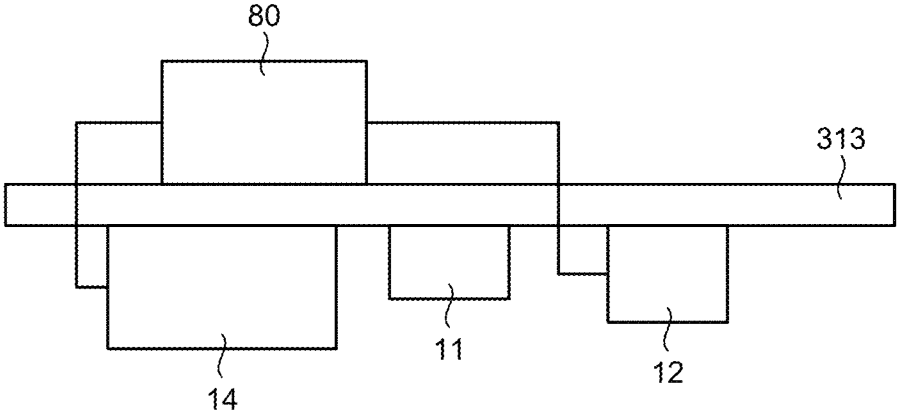
FIG. 24 is a plan view illustrating a configuration of a part of an absolute encoder included in the linear motor according to the fifth embodiment.

FIG. 24 is a plan view illustrating a configuration of a part of the absolute encoder 310 included in the linear motor 300 according to the fifth embodiment. The light emitting element 11, the image sensor 12, the magnetic sensor 14, and the control circuit 80 are fixed to the linear stage 302 via a support 313. The light emitting element 11, the image sensor 12, and the magnetic sensor 14 are mounted on a surface of the support 313 facing the scale 311.

The absolute position calculation unit 13 reads a code string of the optical pattern 314 by the image sensor 12 that moves with the linear stage 302. On the basis of a section determined by the section determination unit 15 and the code string read, the absolute position calculation unit 13 obtains the absolute position that is the position of the linear stage 302 in the linear direction.

Although FIG. 24 illustrates the control circuit 80 functioning as the absolute position calculation unit 13 and the section determination unit 15, the absolute encoder 310 may be provided with the hardware circuit 85 instead of the control circuit 80, or may be provided with a combination of the control circuit 80 and the hardware circuit 85.

The linear motor 300 includes the absolute encoder 310, thereby capable of detecting the absolute position with high accuracy. The linear motor 300 capable of detecting the absolute position with high accuracy can achieve high reliability.

The configurations illustrated in the above embodiments each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST

10, 10A, 311 scale; 11 light emitting element; 12 image sensor; 13 absolute position calculation unit; 14 magnetic sensor; 15 section determination unit; 16 shaft; 17 section storage unit; 20, 314 optical pattern; 21 reflecting portion; 22 non-reflecting portion; 23 first code pattern; 24 second code pattern; 25 third code pattern;

26 fourth code pattern; 30, 312 magnet; 31, 71 sin wave track; 32, 72 cos wave track; 33, 35 N pole; 34, 36 S pole; 40, 41 waveform; 43 high bit; 44 low bit; 45 threshold level; 46 edge pixel position; 50 edge; 51 rising edge; 52 falling edge; 53 bit string; 54 reference pixel position; 60 light receiving unit; 61, 62 light receiving element; 63 substrate; 70 optical track; 80 control circuit; 81 input unit; 82 processor; 83 memory; 84 output unit; 85 hardware circuit; 86 processing circuitry; 100, 100A, 100B, 310 absolute encoder; 200 rotary motor; 201 cap; 300 linear motor; 301 stator; 302 linear stage; 313 support.

The invention claimed is:

1. An absolute encoder comprising:

a scale including an optical pattern that includes code patterns for a plurality of cycles, the optical pattern being a pattern of only one track;

an illumination device to output light for illuminating the scale;

a light detection device to detect light from the scale receiving the light from the illumination device, and output a signal corresponding to intensity of the light detected;

processing circuitry configured to:

determine, for a region of the optical pattern divided into a plurality of sections, a section to which a code string belongs from among the plurality of the sections, the plurality of the sections being obtained by a signal track dividing a pattern region that is a region in which the optical pattern is formed on the scale, the code string being read on the basis of the signal from the light detection device; and obtain an absolute position of the scale on the basis of the determined section among the plurality of the sections and the code string, wherein the code patterns for the cycles on the scale are code patterns identical to each other, when N is the number of the cycles of the code patterns on the scale, in a case where N is equal to two, the number of sections among the plurality of the sections in the pattern region is three or more, and in a case where N is equal to three or more, the number of the sections among the plurality of the sections in the pattern region is N or more, the processing circuitry is further configured to determine each of the sections among the plurality of the sections adjacent to each other as the section corresponding to the code string at a boundary between the sections among the plurality of the sections, and the signal track is formed at a position spaced apart from the optical pattern in a direction intersecting a moving direction of the scale.

2. The absolute encoder according to claim 1, wherein:

the processing circuitry detects an error in determination in a first calculation cycle on the basis of section information indicating a result of determination of the section in a second calculation cycle that precedes the first calculation cycle in which the section is determined.

3. The absolute encoder according to claim 2, wherein:

the processing circuitry detects the error in the determination in the first calculation cycle on the basis of the section information and speed of the scale.

4. The absolute encoder according to claim 1, further comprising:

a magnet integrated with the scale; and a magnetic sensor to detect a magnetic field generated by the magnet, wherein the processing circuitry is further configured to determine the section on the basis of a result of detection of the magnetic field by the magnetic sensor.

5. The absolute encoder according to claim 1, wherein:

an optical track in which intensity of light changes for each of the sections is formed on the scale, and the processing circuitry determines the section on the basis of a result of detection of the intensity of the light from the optical track.

6. The absolute encoder according to claim 1, wherein:

the plurality of the sections include a plurality of angular ranges of the pattern region.

7. The absolute encoder according to claim 6, wherein:

the plurality of the sections including a first section, a second section, and a third section, the first section includes a first angular range among the plurality of the angular ranges of 0 degrees to 120 degrees, the second section includes a second angular range among the plurality of the angular ranges of 120 degrees to 240 degrees, and the third section includes a third angular range among the plurality of the angular ranges of 240 degrees to 360 degrees.

8. The absolute encoder according to claim 6, wherein:

the plurality of the sections including a first section, a second section, a third section, and a fourth section, the first section includes a first angular range among the plurality of the angular ranges of 0 degrees to 90 degrees, the second section includes a second angular range among the plurality of the angular ranges of 90 degrees to 180 degrees, the third section includes a third angular range among the plurality of the angular ranges of 180 degrees to 270 degrees, and the fourth section includes a fourth angular range among the plurality of the angular ranges of 270 degrees to 360 degrees.

9. The absolute encoder according to claim 1, wherein:

the absolute encoder is a linear encoder in which the scale and the signal track extend in a linear direction parallel to the moving direction, and the plurality of the sections include a plurality of regions of the pattern region divided in the linear direction.

10. The absolute encoder according to claim 1, wherein:

the signal track includes a sine wave track and a cosine wave track disposed to be 90 degrees out of phase with the sine wave track.

11. An electric motor comprising:

an absolute encoder including a scale including an optical pattern that includes code patterns for a plurality of cycles, the optical pattern being a pattern of only one track;

an illumination device to output light for illuminating the scale;

a light detection device to detect light from the scale receiving the light from the illumination device, and output a signal corresponding to intensity of the light detected;

processing circuitry configured to:

determine, for a region of the optical pattern divided into a plurality of sections, a section to which a code string belongs from among the plurality of the sections, the plurality of the sections being obtained by a signal track dividing a pattern region that is a region in which the optical pattern is formed on the scale, the code string being read on the basis of the signal from the light detection device; and obtain an absolute position of the scale on the basis of the determined section among the plurality of the sections and the code string, wherein the code patterns for the cycles on the scale are code patterns identical to each other, when N is the number of the cycles of the code patterns on the scale, in a case where N is equal to two, the number of sections among the plurality of the sections in the pattern region is three or more, and in a case where N is equal to three or more, the number of the sections among the plurality of the sections in the pattern region is N or more, the processing circuitry is further configured to determine each of the sections among the plurality of the sections adjacent to each other as the section corresponding to the code string at a boundary between the sections among the plurality of the sections, and the signal track is formed at a position spaced apart from the optical pattern in a direction intersecting a moving direction of the scale.

12. The electric motor according to claim 11, wherein:

the plurality of the sections include a plurality of angular ranges of the pattern region.

13. The electric motor according to claim 12, wherein:

the plurality of the sections including a first section, a second section, and a third section, the first section includes a first angular range among the plurality of the angular ranges of 0 degrees to 120 degrees, the second section includes a second angular range among the plurality of the angular ranges of 120 degrees to 240 degrees, and the third section includes a third angular range among the plurality of the angular ranges of 240 degrees to 360 degrees.

14. The electric motor according to claim 12, wherein:

the plurality of the sections including a first section, a second section, a third section, and a fourth section, the first section includes a first angular range among the plurality of the angular ranges of 0 degrees to 90 degrees, the second section includes a second angular range among the plurality of the angular ranges of 90 degrees to 180degrees, the third section includes a third angular range among the plurality of the angular ranges of 180 degrees to 270 degrees, and the fourth section includes a fourth angular range among the plurality of the angular ranges of 270 degrees to 360 degrees.

15. The electric motor according to claim 11, wherein:

the absolute encoder is a linear encoder in which the scale and the signal track extend in a linear direction parallel to the moving direction, and the plurality of the sections include a plurality of regions of the pattern region divided in the linear direction.

16. The electric motor according to claim 11, wherein:

the signal track includes a sine wave track and a cosine wave track disposed to be 90 degrees out of phase with the sine wave track.

17. An absolute encoder comprising:

a scale including an optical pattern that includes code patterns for a plurality of cycles, the optical pattern being a pattern of only one track;

an illumination device to output light for illuminating the scale;

a light detection device to detect light from the scale receiving the light from the illumination device, and output a signal corresponding to intensity of the light detected;

processing circuitry configured to:

determine, for a region of the optical pattern divided into a plurality of sections, a section to which a code string belongs from among the plurality of the sections, the plurality of the sections being obtained by a signal track dividing a pattern region that is a region in which the optical pattern is formed on the scale, the code string being read on the basis of the signal from the light detection device; and obtain an absolute position of the scale on the basis of the determined section among the plurality of the sections and the code string, wherein the plurality of the sections include a plurality of angular ranges of the pattern region, the code patterns for the cycles on the scale are code patterns identical to each other, when N is the number of the cycles of the code patterns on the scale, in a case where N is equal to two, the number of sections among the plurality of the sections in the pattern region is three or more, and in a case where N is equal to three or more, the number of the sections among the plurality of the sections in the pattern region is N or more, the processing circuitry is further configured to determine each of the sections among the plurality of the sections adjacent to each other as the section corresponding to the code string at a boundary between the sections among the plurality of the sections, and the signal track is formed at a position spaced apart from the optical pattern in a direction intersecting a moving direction of the scale.

18. The absolute encoder according to claim 17, wherein:

the plurality of the sections including a first section, a second section, and a third section, the first section includes a first angular range among the plurality of the angular ranges of 0 degrees to 120 degrees, the second section includes a second angular range among the plurality of the angular ranges of 120 degrees to 240 degrees, and the third section includes a third angular range among the plurality of the angular ranges of 240 degrees to 360 degrees.

19. The absolute encoder according to claim 17, wherein:

the plurality of the sections including a first section, a second section, a third section, and a fourth section, the first section includes a first angular range among the plurality of the angular ranges of 0 degrees to 90 degrees, the second section includes a second angular range among the plurality of the angular ranges of 90 degrees to 180 degrees, the third section includes a third angular range among the plurality of the angular ranges of 180 degrees to 270 degrees, and the fourth section includes a fourth angular range among the plurality of the angular ranges of 270 degrees to 360 degrees.

20. The absolute encoder according to claim 17, wherein:

the signal track includes a sine wave track and a cosine wave track disposed to be 90 degrees out of phase with the sine wave track.

* * * * *